US012606271B2

(12) United States Patent
Hahn et al.

(10) Patent No.: US 12,606,271 B2
(45) Date of Patent: Apr. 21, 2026

(54) SYSTEM FOR A BICYCLE INCLUDING AN ENERGY STORAGE DEVICE

(71) Applicant: SRAM, LLC, Chicago, IL (US)

(72) Inventors: Sage Hahn, Chicago, IL (US); Shelby Sessions, Chicago, IL (US); Alexander Ho, Chicago, IL (US); Cara Ditmar, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 18/815,159

(22) Filed: Aug. 26, 2024

(65) Prior Publication Data

US 2026/0054797 A1 Feb. 26, 2026

(51) Int. Cl.
| | |
|---|---|
| *B62M 6/45* | (2010.01) |
| *B62J 43/13* | (2020.01) |
| *B62J 50/22* | (2020.01) |
| *B62M 6/90* | (2010.01) |
| *H01M 10/42* | (2006.01) |

(Continued)

(52) U.S. Cl.
CPC ............... *B62M 6/45* (2013.01); *B62J 43/13* (2020.02); *B62J 50/22* (2020.02); *B62M 6/90* (2013.01); *H01M 10/425* (2013.01); *H01M 50/213* (2021.01); *H01M 50/249* (2021.01); *H01M 50/296* (2021.01); *H04W 52/0254* (2013.01); *H01M 2010/4271* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 6,352,486 | B1 | 3/2002 | Wesling |
| 9,561,734 | B2 | 2/2017 | Watarai |

(Continued)

FOREIGN PATENT DOCUMENTS

| | | |
|---|---|---|
| CN | 101016076 | 8/2007 |
| CN | 106080937 | 11/2016 |

(Continued)

OTHER PUBLICATIONS

Overholt, Zach, Specialized Recharges Turbo Levo e-MTB w/ added range, power, less weight, more, Website: https://bikerumor. com/specialized-recharges-turbo-levo-e-mtb-w-added-range-power-less-weight-more/ last checked Jul. 27, 2023.

(Continued)

*Primary Examiner* — Todd Melton

(57) ABSTRACT

A system for an electric bicycle includes an energy storage device. The energy storage device includes a housing that is mountable to a frame of the electric bicycle, battery cells disposed within the housing, and output power terminals supported by the housing and electrically connectable to the battery cells. The energy storage device includes a processor and a first wireless communication device. The system includes a human/machine interface (HMI) electrically connected to the energy storage device via the output power terminals. The HMI includes a second wireless communication device. The processor is configured to change a mode of the energy storage device based on a signal received by the first wireless communication device from the second wireless communication device.

20 Claims, 10 Drawing Sheets

(51) Int. Cl.

| | |
|---|---|
| *H01M 50/213* | (2021.01) |
| *H01M 50/249* | (2021.01) |
| *H01M 50/296* | (2021.01) |
| *H04W 52/02* | (2009.01) |

(56) References Cited

U.S. PATENT DOCUMENTS

| | | | | |
|---|---|---|---|---|
| 10,023,139 | B2 | 7/2018 | Watarai et al. | |
| 10,093,379 | B2 * | 10/2018 | Hines | B62J 50/21 |
| 10,472,015 | B1 | 11/2019 | Sonderegger | |
| 11,833,923 | B2 * | 12/2023 | Cerundolo | B60L 50/64 |
| 2012/0253601 | A1 | 10/2012 | Tadashi | |
| 2016/0216169 | A1 | 7/2016 | Tetsuka | |
| 2019/0002053 | A1 | 1/2019 | Kakinoki | |
| 2019/0106178 | A1 | 4/2019 | Shimano | |
| 2020/0377167 | A1 | 12/2020 | Suzuki | |
| 2024/0025506 | A1 | 1/2024 | Stiffel et al. | |
| 2024/0100989 | A1 | 3/2024 | Cerundolo et al. | |
| 2025/0162686 | A1 * | 5/2025 | Kaufmann | B62M 6/90 |

FOREIGN PATENT DOCUMENTS

| | | | |
|---|---|---|---|
| EP | 1449755 | | 12/2005 |
| EP | 3127799 | A1 | 2/2017 |
| EP | 3851365 | | 11/2023 |
| JP | 2019116250 | | 7/2019 |
| JP | 2022167121 | | 11/2022 |
| TW | 201507925 | | 3/2015 |
| TW | 201637933 | | 11/2016 |
| TW | 201713127 | | 4/2017 |
| TW | 201927617 | | 7/2019 |
| TW | 201938441 | | 10/2019 |
| WO | 2014205345 | | 12/2014 |
| WO | 2019043576 | | 3/2019 |

OTHER PUBLICATIONS

Shimano Steps Satellite System On/Off Switch for E-Bike, Website: https://bike.shimano.com/en-EU/product/component/mtb-ebike-e8000/EW-SW100.html last checked Jul. 27, 2023.

Bosch Gmbh Robert: "Active Une/Performance Line Active Line/ Performance Line", May 22, 2017 (May 22, 2017), pp. 1-98, XP093020588, Retrieved from the Internet: URL:https://www.bosch-ebike.com/de/help-center/manuals/bedienungsanleitung-purion-14549 [retrieved on Feb. 3, 2023].

Specialized: "Specialized Turbo Levo User Manual", Morgan Hill, Ca, Nov. 1, 2018 (Nov. 1, 2018), pp. 1-224, XP093205613, Morgan Hill, Ca Retrieved from the Internet: U RL:https ://media. specialized .com/su pport/collateral/00001 08696. pdf.

* cited by examiner

SYSTEM FOR A BICYCLE INCLUDING AN ENERGY STORAGE DEVICE

BACKGROUND

1. Field of the Disclosure

The present disclosure is generally directed to a system for a bicycle, and more particularly, to a system including an energy storage device and a human/machine interface (HMI).

2. Description of Related Art

An electric assist, or electrically powered, bicycle (e.g., an electric bicycle) may be powered with a battery that includes a configuration of individual battery cells and a battery management system. The electric bicycle may have a signal wire or a wired communication bus between the battery and a human-machine-interface (HMI). The HMI may include a button (e.g., a power button) to activate power ports of the battery so that other components of the electric bicycle are powered. The other components of the electric bicycle may include, for example, a drive unit, a display of the HMI, and controls of the electric bicycle. When the electric bicycle is in an "off" state, the drive unit, the display of the HMI, and the controls, for example, may not receive power from the battery.

SUMMARY

In one example, a system for an electric bicycle includes an energy storage device. The energy storage device includes a housing that is mountable to a frame of the electric bicycle, one or more battery cells disposed within the housing, and output power terminals supported by the housing. The output power terminals are electrically connectable to the one or more battery cells. The energy storage device also includes a processor and a first wireless communication device. The system also includes a human/machine interface (HMI) electrically connected to the energy storage device via the output power terminals of the energy storage device. The HMI includes a second wireless communication device. The processor is configured to change a mode of the energy storage device based on a signal received by the first wireless communication device from the second wireless communication device.

In one example, the first wireless communication device is located within the housing of the energy storage device.

In one example, the first wireless communication device includes a first radio and a first antenna.

In one example, the second wireless communication device includes a second radio and a second antenna.

In one example, the processor is located within the housing of the energy storage device.

In one example, the HMI includes an HMI housing, and the second wireless communication device is located within the HMI housing.

In one example, the signal is a system wake message. The HMI further includes a user interface. The HMI is configured to generate the system wake message in response to a user interaction with the user interface of the HMI, and transmit the system wake message to the energy storage device via the second wireless communication device and the first wireless communication device.

In one example, the processor of the energy storage device is configured to change the mode of the energy storage device from a sleep state to an active state based on the system wake signal received by the first wireless communication device from the second wireless communication device. The active state is a full power state of the energy storage device, and the sleep state is a partially powered state of the energy storage device.

In one example, the system wake message is a first signal. The processor of the energy storage device is further configured to change the mode of the energy storage device from the active state based on a second signal received by the first wireless communication device from the second wireless communication device.

In one example, the user interaction is a first user interaction, and the second signal is a sleep message. The HMI is further configured to generate the sleep message in response to a second user interaction with the user interface of the HMI, and transmit the sleep message to the energy storage device via the second wireless communication device and the first wireless communication device. The processor of the energy storage device is further configured to change the mode of the energy storage device from the active state to the sleep state based on the sleep message received by the first wireless communication device from the second wireless communication device.

In one example, when the energy storage device is in the partially powered state, the processor is further configured to impose an electrical current limit for current flowing from the one or more battery cells to the output power terminals, and periodically turn on the first wireless communication device to receive instructions.

In one example, when the energy storage device is in the full powered state, the processor of the energy storage device is further configured to increase the electrical current limit for the current flowing from the one or more battery cells to the output power terminals, and set the first wireless communication device to be continuously on.

In one example, the HMI is electrically connected to the energy storage device via only the output power terminals of the energy storage device.

In one example, the processor is a first processor. The system further includes a drive unit electrically connected to the energy storage device via the output power terminals of the energy storage device. The drive unit includes a second processor, a third wireless communication device, and a motor. The second processor is configured to change a mode of the drive unit from a first mode to a second mode based on a signal received by the third wireless communication device from the second wireless communication device. The motor of the drive unit is operable in one mode of the first mode and the second mode, and the motor of the drive unit is inoperable in the other mode of the first mode and the second mode.

In one example, the drive unit is electrically connected to the energy storage device via only the output power terminals of the energy storage device.

In one example, a method of operating an electric bicycle includes receiving, by a first wireless communication device of the electric bicycle, a signal from a second wireless communication device of the electric bicycle. The first wireless communication device is a wireless communication device of an energy storage device of the electric bicycle, and the second wireless communication device is a wireless communication device of a human/machine interface (HMI) electrically connected to the energy storage device via output power terminals of the energy storage device. The method also includes changing, by a processor of the energy storge device, a mode of the energy storage device in response to the received signal.

In one example, the signal is a system wake message. The method further includes generating, by a processor of the HMI, the system wake message in response to a user interaction with a user interface of the HMI, and transmitting, by the second wireless communication device, the generated system wake message to the energy storage device via the first wireless communication device.

In one example, changing the mode of the energy storage device in response to the received system wake message includes changing the mode of the energy storage device from a sleep state of the energy storage device to an active state of the energy storage device in response to the received system wake message. The active state of the energy storage device is a full power state of the energy storage device, and the sleep state of the energy storage device is a partially powered state of the energy storage device.

In one example, the method further includes imposing, by the processor of the energy storage device, an electrical current limit for current flowing from one or more battery cells of the energy storage device to the output power terminals of the energy storage device when the energy storage device is in the partially powered state.

In one example, an energy storage device for an electric bicycle includes a housing that is mountable to a frame of the electric bicycle, one or more battery cells disposed within the housing, and output power terminals supported by the housing. The output power terminals are electrically connectable to the one or more battery cells, such that a human/machine interface (HMI) of the electric bicycle is powerable by the one or more battery cells via the output power terminals. The energy storage device also includes a processor and a first wireless communication device. The processor is configured to change a mode of the energy storage device from a first mode to a second mode based on a signal received by the first wireless communication device from a second wireless communication device. The second wireless communication device is a wireless communication device of the HMI. The first mode and the second mode of the energy storage device are different power states of the energy storage device, respectively.

BRIEF DESCRIPTION OF THE DRAWINGS

Objects, features, and advantages of the present invention will become apparent upon reading the following description in conjunction with the drawing figures, in which:

FIG. 2 is a side perspective view of an energy storage device mounted to a bicycle frame.

FIG. 7 is a block diagram illustrating one embodiment of an energy storage device.

DETAILED DESCRIPTION OF THE DISCLOSURE

Figure 1:
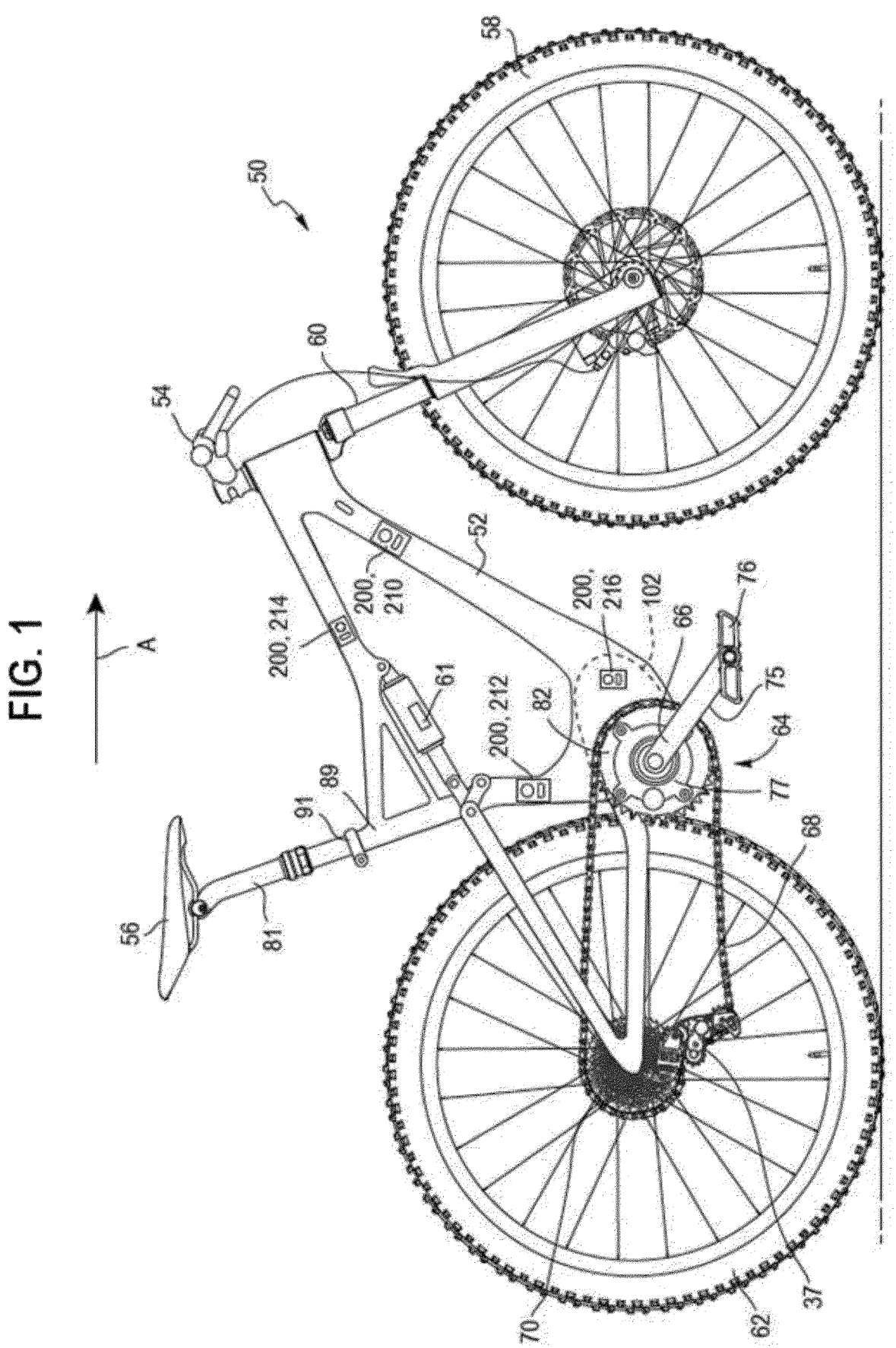
FIG. 1 is a side view of one example of a bicycle.

In order to minimize the size, cost, and complexity of a connector of a battery of a bicycle (e.g., an electric bicycle), a number of connections between the battery and other components of the bicycle, such as, for example, a human-machine-interface (HMI) and a drive unit, may be minimized. The number of connections may be minimized by elimination of a wired communication bus of the battery.

The present disclosure provides examples of wireless control of power output from the battery, such that the wired communication bus, and thus a wired signal to power the battery on and off, may be eliminated. The battery may change modes based on wireless signals received from another component of the bicycle, such as, for example, the HMI. Components of the bicycle such as, for example, the HMI and the drive unit may be electrically connected to the battery only via power outputs of the battery.

The battery includes a sensor configured to identify whether the battery is installed on the bicycle, and is configured to physically disconnect the electrical connections between battery cells of the battery and the HMI and the drive unit, respectively, when the sensor identifies the battery is not installed on the bicycle. When the sensor of the battery determines the battery is not installed on a frame of the bicycle, for example, a processor of the battery determines the battery is in a removed state (e.g., transitions the battery to the removed state). In the removed state, the processor of the battery disconnects the power connections of the battery to the HMI and the drive unit, for example, via the power outputs of the battery. This prevents accidental short circuit of the battery. In the removed state, a receiver of a radio of the battery is powered off to conserve power of the battery. In the removed state, a transmitter of the radio of the battery may be periodically powered on, and the processor of the battery may generate status messages and transmit the status messages wirelessly via the transmitter of the radio of the battery. The processor of the battery may transmit the status messages to any number of devices on and/or off the bicycle including, for example, a computing device off of the bicycle (e.g., a smart phone). The status messages may include information about the battery including, for example, a state of charge, a temperature, and/or other information about the battery.

When a user installs the battery onto the bicycle, the sensor of the battery determines the battery is installed on the frame of the bicycle. When the sensor determines the battery is installed on the frame of the bicycle, the processor of the battery transitions the battery from the removed state to a sleep state. After installation of the battery onto the bicycle but before the processor transitions the battery to the sleep state, or after the processor of the battery transitions the battery to the sleep state, the processor of the battery may perform a communication negotiation, such that a communication network is established between the battery and one or more components on and/or off of the bicycle. In the sleep state of the battery, the processor of the battery activates power to the power outputs (e.g., terminals or connectors) of the battery, such that the components of the bicycle electrically connected to the battery only via the power outputs of the battery (e.g., the HMI and the drive unit) are powered. Within the sleep state of the battery, the processor of the battery may impose an electrical current limit, such that when the processor of the battery detects current draw greater than what is expected (e.g., the electrical current limit) within the sleep state of the battery (e.g., the electric bicycle is off, no motor assistance possible), the processor of the bicycle may disable the power output via the power outputs of the battery to prevent unintended operation of the bicycle.

The battery may include another sensor. The other sensor may be a vibration sensor such as, for example, an accelerometer. When the battery has been in the sleep state for a predetermined amount of time, (e.g., 30 minutes, one hour, one day), and the vibration sensor has not detected vibration activity (e.g., above a predetermined vibration threshold) and the radio of the battery has not received messages during the predetermined amount of time, the processor may transition the battery to an off state.

In the off state of the battery, the processor of the battery electrically disables the power outputs (e.g., with a switch of the battery) to the rest of the bicycle (e.g., the HMI and the drive unit of the bicycle). The processor may also turn off the receiver of the radio completely to preserve power. When the battery is in the off state (e.g., off but installed state) and the other sensor detects vibration (e.g., caused by a user of the bicycle moving the bicycle), the processor of the battery transitions the battery from the off state to the sleep state. Again, within the sleep state of the battery, power is applied to the HMI and the drive unit, for example, via the power outputs of the battery.

In the sleep state of the battery, the processor of the battery periodically turns on the receiver of the radio of the battery, such that the receiver of the radio of the battery may receive a startup instruction (e.g., a system wake message). The processor of the battery may turn on the receiver of the radio of the battery at any number of different duty cycles including, for example, 10%. The duty cycle of the receiver of the radio of the battery may be set, such that an overlap in transmission of the startup instruction is provided. Any number of components and/or devices on and/or off of the bicycle (e.g., a smartphone, the HMI, and/or the drive unit) may transmit the startup instruction to the battery.

After the processor of the battery identifies receipt of the startup instruction, the processor of the battery may transition the battery (e.g., from the sleep state) to a startup state. Within the startup state of the battery, the processor may generate an acknowledgement message that acknowledges receipt of the startup instruction. The processor of the battery may transmit the acknowledgement message to any number of components on and/or off the bicycle (e.g., the smart phone, the HMI, and/or the drive unit) via, for example, the radio of the battery.

The processor of the battery may perform one or more other actions before the processor transitions the battery from the startup state to an active state. For example, the processor of the battery may initialize sensor(s) of the battery, execute a self-test, load-volatile storage, and/or execute another action.

In the active state of the battery, the processor of the battery may identify status information about the battery, and transmit the status information, via the radio of the battery, to any number of components on and/or off the bicycle (e.g., the smart phone, the HMI, and/or the drive unit). The status information about the battery may include any number of different types of information. For example, the status information may include a state of charge of the battery, one or more temperatures of the battery, and/or other information about the battery.

In the active state of the battery, the processor of the battery may turn the receiver of the radio on to continuously receive messages. The processor may also increase the electrical current limit, such that activation of a motor of the drive unit may be permitted. The processor of the battery may generate messages including information about a maximum recommended current to be drawn by the motor to prevent triggering an undervoltage condition in the battery, and the processor may transmit the messages, via the radio, to one or more components on and/or off the bicycle (e.g., the smart phone, the HMI, and/or the drive unit).

In the active state of the battery, the processor of the battery may run an activity timer, and based on the activity timer, when the processor of the battery identifies that there has been no vibration, no wireless activity, and no discharge current for a predetermined period of time (e.g., 30 minutes, one hour, or one day), the processor of the battery may transition the battery back to the sleep state.

In the active state of the battery, when the battery receives, via the radio, a sleep message (e.g., from the smart phone, the HMI, and/or the drive unit), the processor of the battery may acknowledge receipt of the sleep message in a prepare for sleep state of the battery, and transition the battery from the active state to the sleep state.

The HMI and the drive unit, for example, may also move between any number of states based on user input at the HMI and/or the drive unit, respectively, and/or messages received from the battery via, for example, the radio of the battery. For example, the HMI may transition from an off state to a sleep state when the power outputs of the battery are activated. When a user interacts with an interface (e.g., a power button) of the HMI when the HMI is in the sleep state, the HMI may transition from the sleep state to a startup state. In the startup state, the HMI may generate and transmit system wake messages until one or more acknowledgement messages are received. When the HMI receives acknowledgement message(s) while in the startup state, the HMI transitions to an active state. The HMI may transition from the active state to a prepare for sleep state after the user interacts with the interface (e.g., the power button) of the HMI while the HMI is in the active state. The HMI may generate and transmit system sleep messages while the HMI is in the prepare for sleep state, and may transition from the prepare for sleep state back to the sleep state when acknowledgements to the system sleep messages are received. When the HMI is in the active state or the sleep state and receives a charging state message, the HMI may enter a show charging state, in which information about the battery may be displayed on the HMI. When the HMI is in the active state and receives a fault message, the HMI may enter a display fault info state, in which fault information may be displayed on the HMI.

As another example, the drive unit may transition from an off state to a sleep state when the power outputs of the battery are activated. In the sleep state of the drive unit, the drive unit periodically turns on a receiver of a radio of the drive unit to receive a system wake message (e.g., from the HMI). When the drive unit receives a system wake message, the drive unit transitions to a startup state of the drive unit. In the startup state, the drive unit generates and transmits acknowledgement of receipt of the system wake message, and transitions to an active state. In the active state, when the drive unit receives a sleep message, the drive unit may transition to a prepare for sleep state and acknowledge receipt of the sleep message. The drive unit may then transition back to the sleep state. When the drive unit is in the active state and receives a fault message, the drive unit may enter a safe state and configure sensor and motor drivers to safe configurations. When the drive unit is in the active state or the sleep state and receives a charging state message, the HMI may enter a system charge state, in which the drive unit disables motor activation. This may be for when charging is occurring while the battery in installed on the bicycle. When the drive unit is in the active state and receives a fault message, the drive unit may enter a safe state and send out a status message that includes fault information.

The examples solve or improve upon one or more of the above-noted and/or other disadvantages. The disclosed battery does not include a power button signal/communications bus, and powering the battery on/off is controlled wirelessly. This minimizes the size, cost, and complexity of connectors (e.g., power outputs) of the battery. In other words, this allows for simplified, more reliable connectors of the battery. More specifically, the disclosed battery allows for a lower cost cable harness due to fewer connectors and a less bulky cable harness due to fewer conductors.

It should be understood that the term "plurality," as used herein, is two or more. The term "longitudinal," as used herein, is of or relating to a length or lengthwise direction. The term "lateral," as used herein, is situated on, directed toward, or running in a side-to-side direction. The term "coupled" is connected to or engaged with, whether directly or indirectly (e.g., with an intervening member). The term "coupled" does not require the engagement to be fixed or permanent, although the engagement may be fixed or permanent. The term "connected" may refer to an electrical or mechanical connection. The term "communicating" refers to a connection allowing for the transfer of power and/or data, and may include a wired or wireless connection.

The terms "first," "second," and so on, as used herein are not meant to be assigned to a particular component so designated, but rather are simply referring to such components in the numerical order as addressed. This provides that a component designated as "first" may later be a "second" such component, depending on the order in which the component is referred. It should also be understood that designation of "first" and "second" does not necessarily provide that the two components or values so designated are different. This provides that, for example, a first direction may be the same as a second direction, with each simply being applicable to different components.

Figure 2:
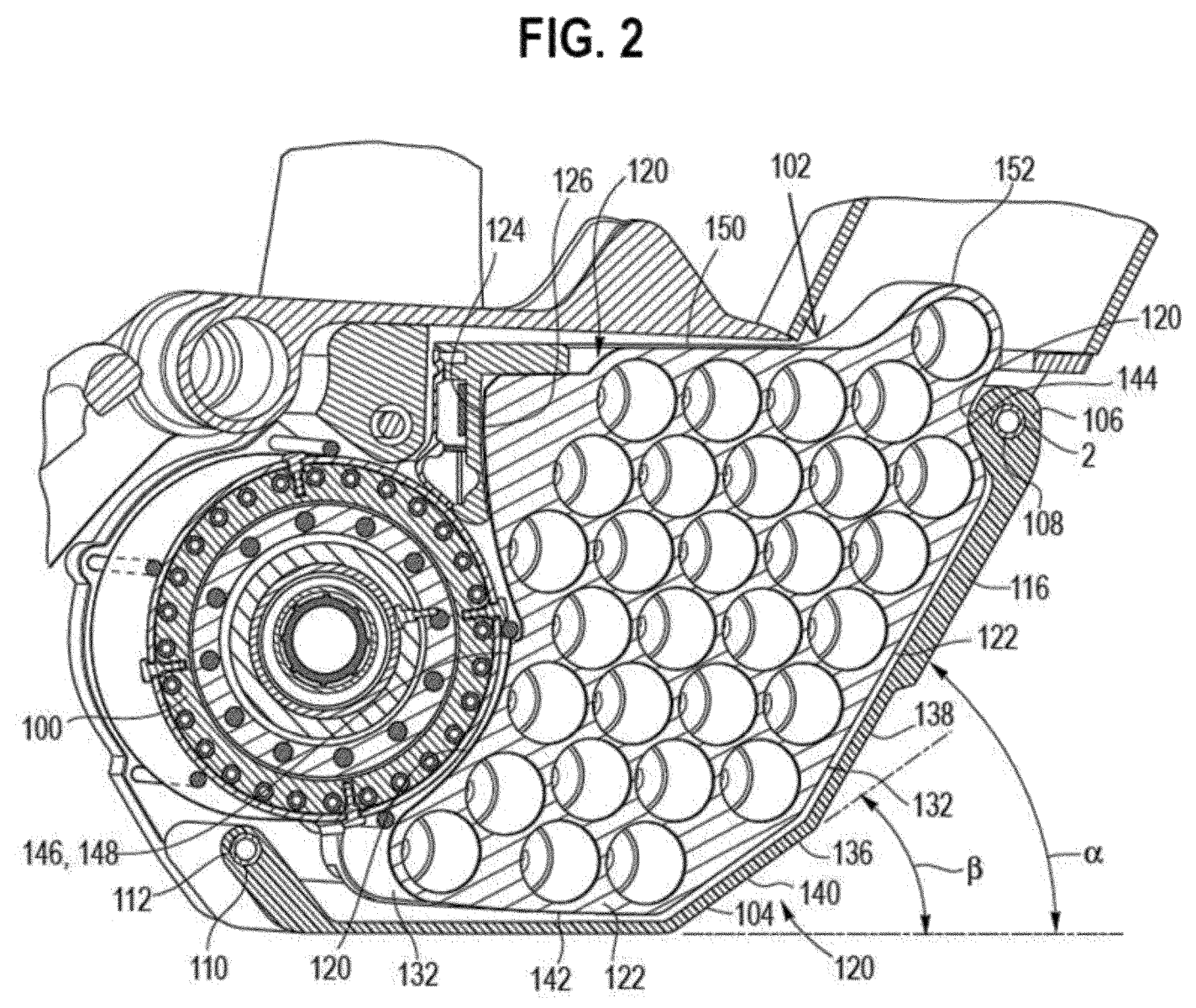

The terms "upper," "lower," "rear," "front," "fore," "aft," "vertical," "horizontal," "right," "left," "inboard," "outboard" and variations or derivatives thereof, refer to the orientations of an example bicycle 50, shown in FIG. 1, from the perspective of a user seated thereon. For example, an "inboard" component or feature is closer to a vertical mid-plane of the bicycle extending in a direction A. The term "transverse" is non-parallel. The terms "outer" and "outwardly" refer to a direction or feature facing away from a centralized location. For example, the phrases "radially outwardly," "radial direction," and/or derivatives thereof refer to a feature diverging away from a centralized location (e.g., a rotation axis 2 of a bash guard as shown in FIG. 2). Conversely, the terms "inward" and "inwardly" refer to a direction facing toward the centralized or interior location. The term "subassembly" refers to an assembly of a plurality of components, with subassemblies capable of being further assembled into other subassemblies and/or a final assembly, such as the bicycle 50.

FIG. 1 illustrates one example of a human powered vehicle that may also include an electrically powered drive system. In this example, the vehicle is one possible type of bicycle 50, such as a mountain bicycle. The bicycle 50 has a frame 52, handlebars 54 near a front end of the frame 52, and a seat or saddle 56 for supporting a rider over a top of the frame 52. The bicycle 50 also has a first or front wheel 58 carried by a front fork subassembly 60 supporting the front end of the frame 52. The bicycle 50 also has a second or rear wheel 62 supporting a rear end of the frame 52. The rear end of the frame 52 may be supported by a rear suspension component 61, such as a rear shock. The bicycle 50 has a drive train 64 with a crank assembly 66 that is operatively coupled via a roller chain 68 to a rear cassette 70 or a driven sprocket assembly near the hub providing a rotation axis of the rear wheel 62. The crank assembly 66 includes at least one, and typically two, crank arms 75 and pedals 76, along with a front chainring assembly 82 or a drive sprocket assembly. A crank spindle or shaft may connect the two crank arms. The crank shaft defines a center rotational axis of the chainring assembly 82. The crank assembly 66 may also include other components.

A rear gear change device 37, such as a derailleur, is disposed at the rear wheel 62 to move the roller chain 68 through different sprockets of the cassette 70. In one embodiment, a front gear changer device (not shown), such as a derailleur, may be provided to move the chain 68 through multiple sprockets of the chainring assembly 82, if present. In the illustrated example, the saddle 56 is supported on a seat post 81 having an end portion received in a top of a frame seat tube 89 of the frame. A clamping ring 91 may be tightened to secure the upper seat post 81 to the lower frame seat tube 89. In FIG. 1, the arrow A depicts a normal riding or forward moving direction of the bicycle 50. The drive train may be configured with a power meter device 77.

Referring to FIGS. 1 and 2, the bicycle 50 includes a drive unit 100 mounted on the frame 52 and coupled to the crank assembly 66. The drive unit 100 may be powered to assist, partially or entirely, with the rotation of the crank assembly 66, the associated movement of the chain 68, and the associated rotation of the cassette 70 and rear wheel 62. The drive unit 100 may be electrically coupled to an energy storage device 102, otherwise referred to as a battery, which supplies power to the drive unit 100.

Referring to FIG. 2, the energy storage device 102 is held in place by an upper contact 126 engaging a battery contact connection 124, and a bash guard 104 mounted to the frame 52 at a mounting feature 106, configured as a lug in one embodiment. The mounting feature 106 of the bash guard 104 defines a rotation axis 2 and includes an opening that receives a fastener 108 (e.g., pin or shaft), which secures the mounting feature 106 to the frame 52. The bash guard 104 includes a detent feature that engages the energy storage device 102. The bash guard 104 may rotate around the axis 2. The bash guard 104 includes a second mounting feature 110, configured as a lug in one embodiment, which is further connected to the frame 52 at a second connection point. The second connection point is defined by a releasable or removeable fastener 112. In one embodiment, the fastener 112 is configured as a pin that may be inserted through an opening in the mounting feature 110 in the bash guard 104 and engaged with corresponding openings located on the bicycle frame 52 or the drive unit 100. The fastener 112 may be removed, such that the bash guard 104 may be rotated about the axis 2 and thereby lowered. The bash guard 104 includes a plate/support structure 116 extending between the mounting features 106, 110.

The energy storage device 102 may be disposed on the bash guard 104, or engaged therewith, for example, by nesting the energy storage device 102 on the plate/support structure 116. The energy storage device 102 and the bash guard 104 may thereafter be rotated in an opposite direction about the axis 2 until the battery contact connection 124 (e.g., power outputs or output terminals) on the energy storage device 102 contacts, and is engaged by, the corresponding contact 126 on the drive unit, or frame 52, which may be defined by a pair of prongs. The fastener 112 may then be inserted to fix the location of the energy storage device 102 and the bash guard 104 relative to the frame 52 and the drive unit 100, while maintaining the electrical connection between the drive unit 100 and the energy storage device 102 through the battery contact connection 124 and the contact 126. In this way, the energy storage device 102 is held in place relative to the frame 52 and drive unit 100 by a mounting arrangement 120.

The mounting arrangement 120 may be defined by a shape of an energy storage device housing 122 and an interface between the housing 122, the bash guard 104, the frame 52, and/or the drive unit 100. The phrase "mounting arrangement" refers to any structure that maintains a position of the energy storage device 102 relative to the frame 52 and/or the drive unit 100. The phrase "mounting arrangement" may include an interface between the housing 122 and the frame 52 and/or the drive unit 100, including an interface between the contacts 124, 126, and/or may include additional fasteners, such as bolts, tabs, clips, snaps, detents, insert/socket interfaces, and/or other suitable connectors. The energy storage device 102 (e.g., the housing 122 of the energy storage device 102) is releasably connected to the frame 52 and/or the drive unit 100, providing that the energy storage device 102 and the housing 122 may be moved from an engaged position to a disengaged position, and may be replaced with another energy storage device.

Referring to FIGS. 2-5, the housing 122 may be configured with sidewalls 130 (e.g., a pair of laterally spaced apart opposite sidewalls), or covers, and a peripheral wall 132 extending between and connected to the sidewalls 130. The peripheral wall 132 and one of the sidewalls 130 may define a shell that is covered by the other sidewall 130, with the sidewalls 130 each defining a cover. The sidewalls 130 have an outer edge 134 that generally mates with or follows a contour of the peripheral wall 132.

As shown, for example, in FIG. 2, the outer edges 134 and the peripheral wall 132 have a front face 136 having an upper portion 138 and a lower portion 140 forming a first acute angle α and a second acute angle β relative to a bottom face 142. The front face 136 further includes a concave recess 144 or socket that receives the mounting feature 106 of the bash guard 104, which is nested in the recess 144 that partly defines the mounting arrangement 120 of the energy storage device 102. The bottom face 142 extends rearwardly from the lower portion 140 of the front face 136. The housing 122 further includes a rear face 146 extending upwardly from the bottom face 142. The rear face 146 includes a second concave recess 148 that receives an outer periphery of the drive unit 100, which is nested in the second recess 148 that partly defines the mounting arrangement 120 of the energy storage device 102. A top face 150 of the peripheral wall extends forwardly from the rear face 146 and is connected to the front face 136 at a protruding corner 152.

Figures 3, 4, 5:
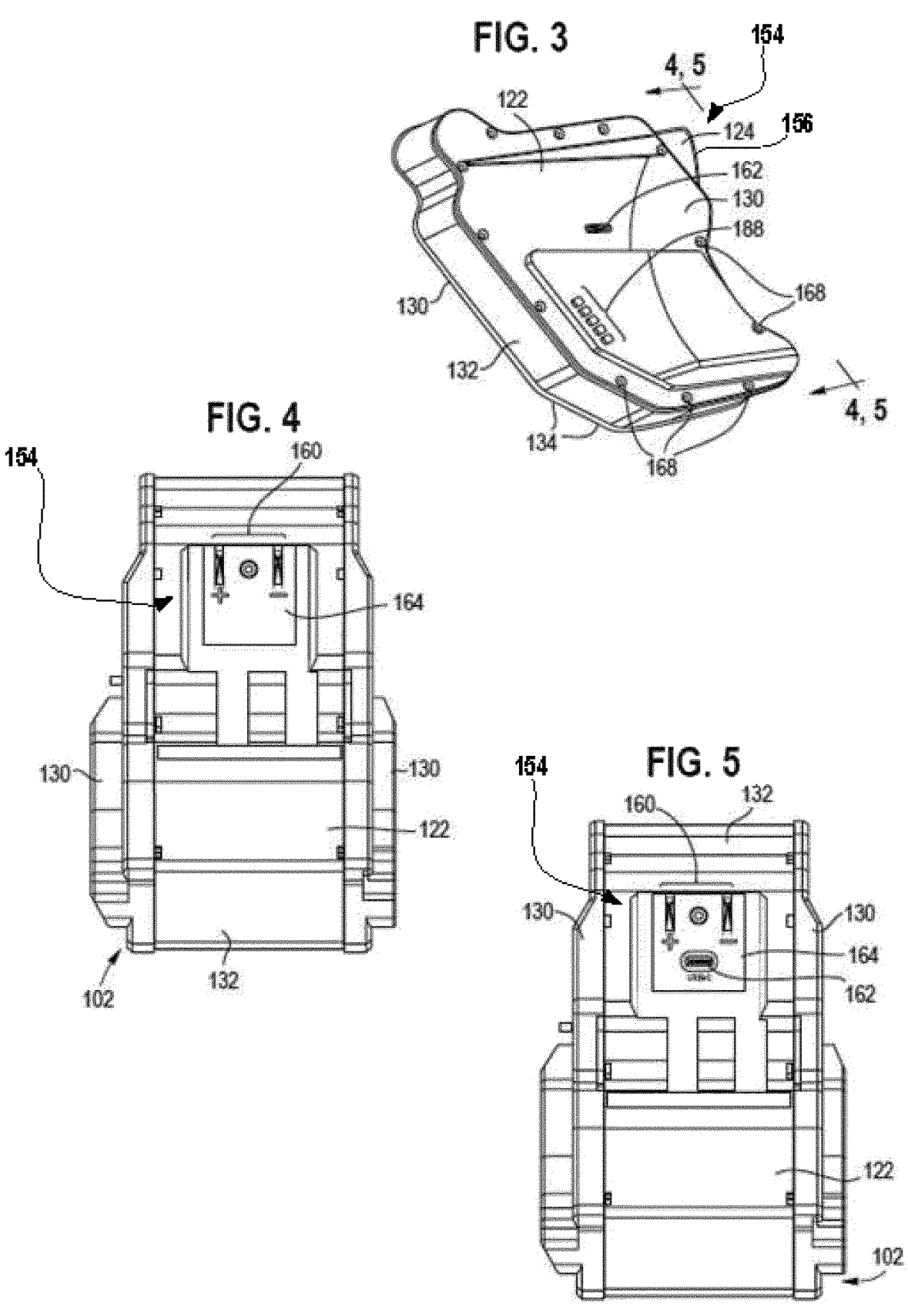
FIG. 3 is a side perspective view of one embodiment of an energy storage device.
FIG. 4 is an end view of one embodiment of the energy storage device taken along line 4-4 of FIG. 3.
FIG. 5 is an end view of another embodiment of an energy storage device taken along line 5-5 of FIG. 3.

Referring to FIGS. 3-5, the housing 122 includes a charging portion 154 or platform that protrudes or extends from the peripheral wall 132 and has a width less than an overall width of the peripheral wall 132. The charging portion 154 may be integrally formed with the peripheral wall 132. The charging portion 154 may include one or more charge ports 160, 162 that may be formed in a plate 164 partly defining in part a rear face portion 156 of the charging portion 154. The battery contact connection 124 is located on, and defines in part, the rear face portion 156 of the charging portion 154, and may be defined by the charge port 160.

In one embodiment, shown in FIG. 5, the first charge port 160 is configured as a DC charge port, including, for example, a pair of electrical contacts, and the second charge port 162 is configured as a USB C charge port. The charge ports 160, 162 may be co-located (e.g., on a same mounting plate 164 that may be a removeable cover secured to the charging portion 154). Alternatively, one or both of the charge ports 160, 162 may be spaced apart and located on different parts of the housing (e.g., on one of the sidewalls 130). For example, as shown in FIGS. 3 and 4, the second charge port 162, configured as the USB C charge port, is located on an outer side wall 130, and the first charge port 160 is located on the mounting plate 164. The charge ports 160, 162 may be located, separately or together, on any portion of the housing 122. In another embodiment shown, for example, in FIG. 4, the energy storage device 102 is configured with only a single charge port 160.

Figure 6:
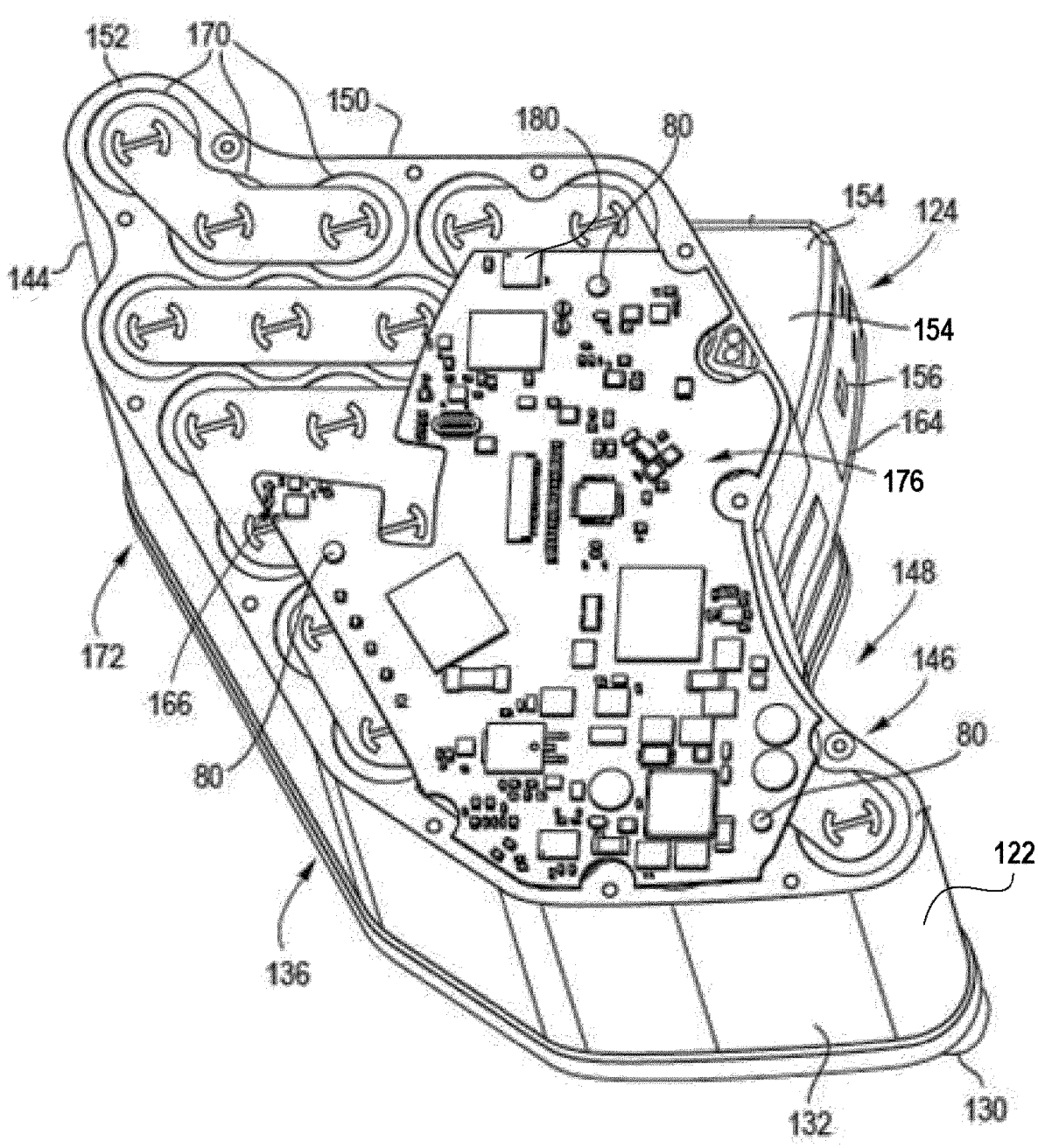
FIG. 6 is a side perspective view of one embodiment of an energy storage device with a side wall cover removed.

Referring to FIG. 6, the sidewalls 130 and the peripheral wall 132 define an interior cavity 166 of the housing 122. Referring to FIG. 3, the sidewalls 130 may be attached to the peripheral wall 132 with a plurality of fasteners 168 shown as screws, or may be integrally formed therewith or connected with other fasteners, such as adhesive, snap-fit, tabs, clips, and/or other suitable fasteners.

Figure 7:
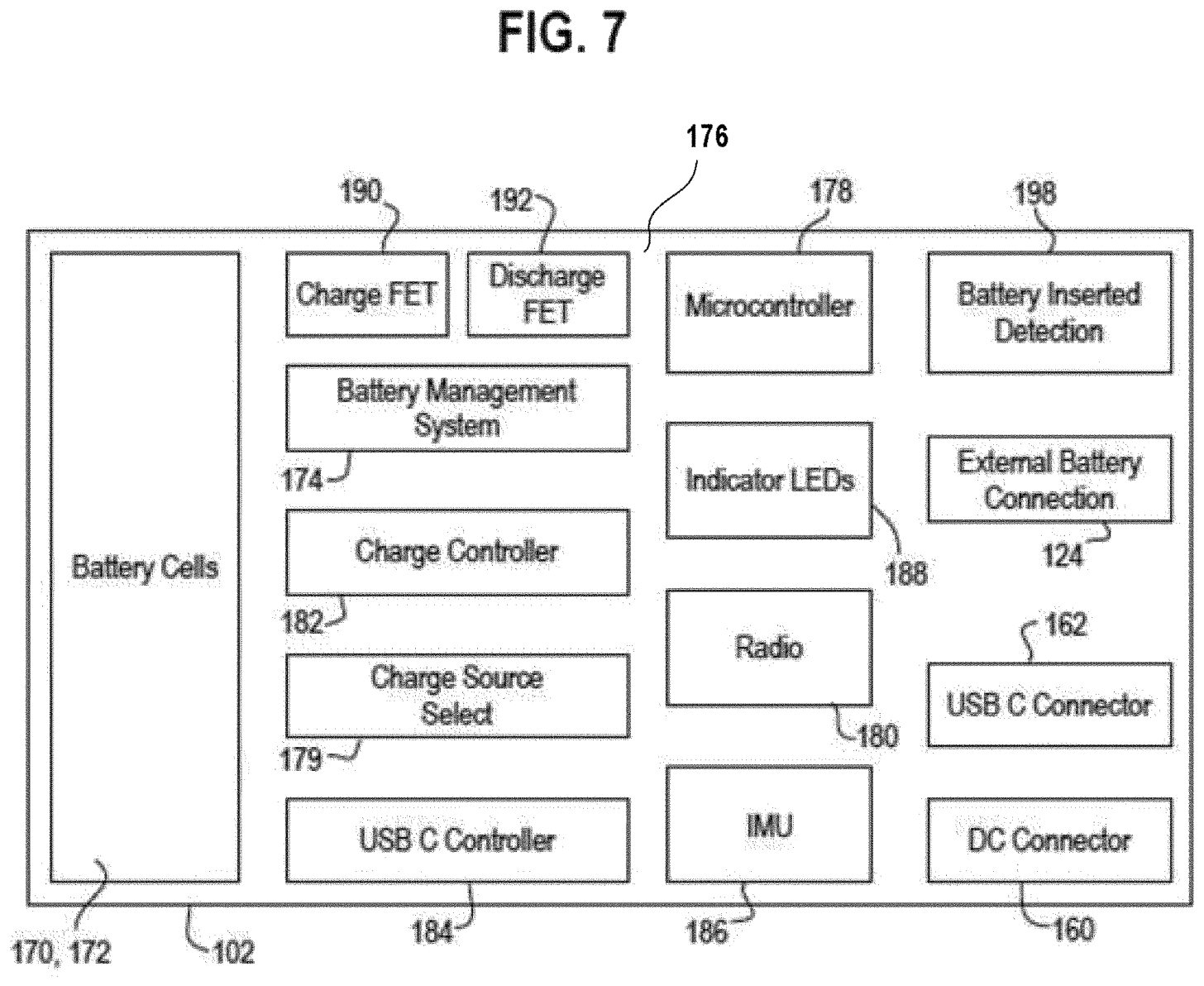

Referring to FIGS. 6 and 7, the energy storage device 102 includes a plurality of battery cells 170 disposed or located in the housing 122 (e.g., in the interior cavity 166 of the housing 122). The battery cells 170 are individual cells that are connected in series and parallel to create a battery pack 172. Battery pack cell configurations are described by the number of cells 170 in series and the number of cells 170 in parallel. A 10S-3P battery pack 172 contains ten series connected groups of 3 cells in parallel. Any number of cell configurations may be provided for use in the energy storage device 102, including, for example, 10S-3P, 13S-2P, and 16S-2P configurations.

The energy storage device 102 includes a battery management system (BMS) 174 disposed in the housing 122. The BMS 174 may be mounted on a printed circuit board (PCB) 176 disposed in the housing 122. The PCB 176 overlies and is electrically connected to the battery cells 170 (e.g., via corresponding connectors). The PCB 176 is also disposed or mounted in the interior 166 of the housing 122, for example, with fasteners 80 connected to the housing 122. The BMS 174 connects to each series set of cells in the battery pack 172 to monitor voltage of the cells for faults. The BMS 174 also measures current into and out of the battery pack 172 to protect against over current faults. The BMS 174 may include temperature sensors that are distributed throughout the battery pack 172 to monitor a temperature of the battery pack 172 during charge and discharge to prevent damage to the battery pack 172 due to overheating.

Using all of this information, the BMS 174 may control charge and discharge field-effect transistors (FETS) 190, 192 to either connect or disconnect the battery pack 172 from the rest of the system during charge and discharge. The BMS 174 receives configuration information from a microcontroller 178 (e.g., a processor) and a radio 180. The processor 178 and the radio 180 are, for example, supported by (e.g., positioned within) the housing 122. Configuration information may include charge/discharge current limits, individual cell voltage limits, and over/under temperature limits that may be preset by the microcontroller firmware. The configuration information may also be updated via a firmware update or dynamically based on information received by the microcontroller 178 from other systems on the bicycle, received, for example, wirelessly by the radio 180.

The energy storage device 102 includes a charge controller 182 disposed in the housing 122 and mounted on the PCB 176. The charge controller 182 may be connected to a DC power source. The charge controller 182 modulates the DC power to safely charge the battery pack 172. In the case of a lithium ion battery pack, for example, the charge controller 182 supplies a constant current to the battery cells 170 until a target voltage is reached; then, the charge controller 182 supplies constant voltage while the current slowly goes down to zero. During charging, the charge controller 182 communicates with and receives messages from the battery management system 174 and the microcontroller 178, such that the charge controller 182 may modulate the charge current to provide a fast and safe charge based on the state of the battery 102.

The microcontroller 178 may be disposed in the housing 122 (e.g., within the cavity 166 of the housing 122) and mounted on the PCB 176. The microcontroller 178 receives data from the BMS 174, a USB C controller 184, the charge controller 182, an inertial measurement unit (IMU) 186, and/or a smartphone app via wireless or wired communication. The microcontroller 178 uses the data to make determinations about how fast to charge the battery pack 172, how much power to supply from the USB C charge port 162, if connected, whether the energy storage device 102 has been dropped when not installed in the bicycle, when to display a battery state of charge with indicators 188 (e.g., LED's), and/or when to enable the output of the energy storage device 102. A smartphone app may receive information about the energy storage device 102 via the microcontroller 178 and the radio 180. Some of the information that may be transmitted to the user, or human/machine interface (HMI), otherwise referred to as a user interface, such as a smart phone, may be the state of charge, estimated time to charge, faults, temperature of the battery pack, voltages of individual cells, total battery pack voltage, and the health of battery pack. The smartphone app may also transmit information to the battery pack.

The energy storage device 102 may include indicators 188 configured, in one embodiment, as an array of LEDs mounted on the PCB 176, with the LEDs 188 being visible to a user through or on an exterior of the housing 122. The indicators 188 may be a collection of red/blue/green (RGB) LEDs that may be used to display the state of charge, error messages, or general bicycle alerts. The LEDs 188 may be activated depending on whether the energy storage device 102 has been installed, via a battery installation detection device (e.g., a sensor 198) or by the IMU 186.

Indications may also be transmitted to the user via the smartphone app. A push notification for faults may alert the user in more detail of what has caused the energy storage device 102 to fail. Inside the app, battery state of charge and health may be displayed on a display (e.g., a screen) of the device (e.g., the smartphone). In one embodiment, a plurality of indicators 188 are provided, including, for example, five RGB LEDs, to provide various indications. The LEDs 188 may be used may be used in any number of ways to indicate state of charge and faults to the user. For example, a state of charge (SOC) indication may be provided when the energy storage device 102 is not installed into the bicycle, and may be triggered, for example, when the energy storage device 102 is picked up or otherwise moved, with the movement being detected by the IMU 186.

In one embodiment, the indicators 188 are only green LEDs, and brightness of the green LEDs is controlled, such that collectively the green LEDs are dimmed as state of charge decreases. For example, with five LEDs, each LED may then turn off after another 20% state of charge has been consumed by the system. Within each 20%, the LED brightness would decrease from 100% to 0%. Alternatively, the indicators 188 may be configured as RGB LEDs that change from Green to Orange to Red within each 20% of SOC. Faults may be indicated by lighting up specific LEDs or patterns of LEDs in a way that does not look like an SOC indication. For example, a single Red LED may be illuminated in a position that SOC would not indicate. Different positions may indicate different types of faults. Flashing LEDs in a pattern may indicate different faults based on timing and color.

The energy storage device 102 may include a sensor 198 disposed in or on the housing that detects whether the device has been installed on the bicycle. In one embodiment, the sensor 198 is a magnetic sensor configured to detect a magnet disposed on a frame (e.g., the frame 52) of a bicycle (e.g., the bicycle 50) when, for example, the energy storage device 102 is installed on the frame 52 of the bicycle 50. The sensor 198 may include a contact, a force and/or spatial sensor, and may be a magnetic, button, NFC, IR sensor, or any other type of sensor, whether electrical or mechanical.

The IMU 186 may be disposed in or on the housing 122, and may be mounted on the PCB 176. The IMU 186 contains an accelerometer, gyroscope, and/or magnetometer. The IMU 186 may use these three sensors, for example, to determine a position of the energy storage device 102 in space, and a relative movement of the energy storage device 102. The IMU 186 may communicate with the microcontroller 178 to track if the energy storage device 102 has had any impacts when not installed on the bicycle. If an impact is detected, additional safety checks may be performed to ensure the energy storage device 102 is still safe to use. Data from the IMU 186 may also be transmitted via the radio 180 to other components on the bicycle. In one embodiment, the microcontroller 178 is configured to identify vibration (e.g., determine whether the bicycle has moved) based on data from the IMU 186.

The energy storage device 102 includes charge/discharge FETs 190, 192, or MOSFETS, disposed in or on the housing 122. In one embodiment, the charge/discharge FETs 190, 192 may be mounted on the PCB 176. The FETs 190, 192 are used to control the flow of power into and out of the energy storage device 102 during charge and discharge. The FETs 190, 192 also allow the output terminals 124 of the energy storage device 102 to be inactive when the energy storage device 102 is not installed on the bicycle.

Referring to FIGS. 1 and 3-5, the charge ports 160, 162 are referred to as primary charge ports. One or more secondary charge ports 200 may be located anywhere on the bicycle where a power cable, or wires, may be routed to the charge port 200. The terms "primary" and "secondary" are not intended to indicate that one charge port has preference, increased charging capabilities, or primacy over another charge port. Rather, these terms are used only to distinguish ports (e.g., primary) located on the energy storage device 102, or ports (e.g., secondary) located remote to the energy storage device 102.

Secondary charge port locations may be in any orientation and may be configured with any of the DC and/or USB C configurations discussed above. For example, the secondary charge port locations may include a location 210 on the downtube, a location 212 on the seat tube, a location 214 on the top tube, which may be paired, for example, with a human/machine interface (HMI), and/or a location 216 on the drive unit 100. More than one secondary charge port location may be provided on any one bicycle.

The energy storage device 102 and secondary charge port(s) 200 provide multiple potential sources for charge current. Charge current may be supplied via a DC power source connected to the charge port 160 on the energy storage device 102, via a power source connected to the USB C charge port 162 located on the energy storage device 102, or via a power source connected to one of the secondary charge ports 200.

Figure 8:
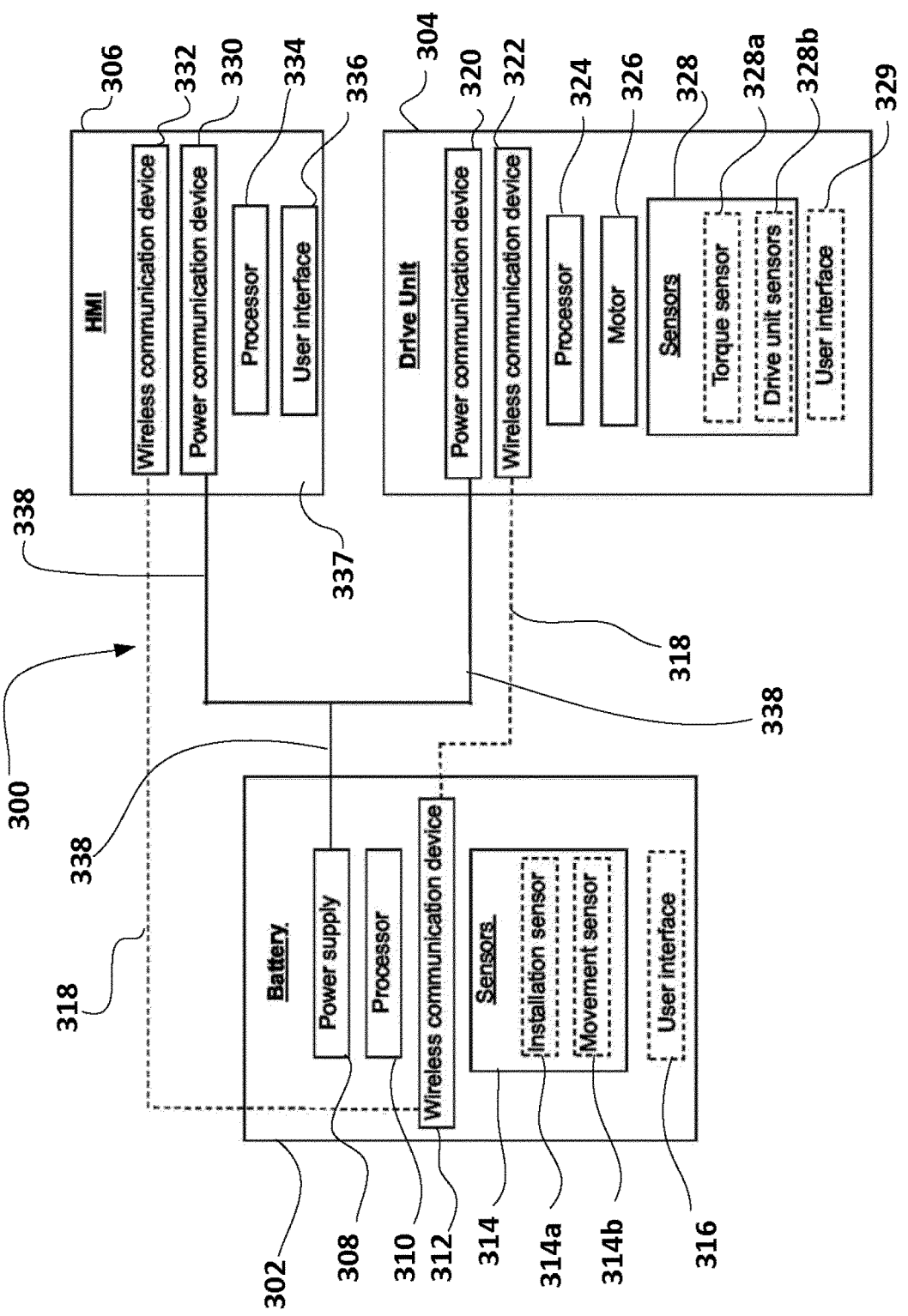
FIG. 8 is a block diagram illustrating one embodiment of a system for a bicycle, such as the bicycle of FIG. 1.

FIG. 8 shows one embodiment of a bicycle system 300 (e.g., an electric bicycle system) that includes an energy storage device 302 (e.g., a battery), a drive unit 304, and an HMI 306. The HMI 306 may be positioned on the bicycle, remote from (e.g., at a distance relative to) the battery 302 and the drive unit 304. For example, the battery 302 and the drive unit 304 may be positioned at and/or adjacent to a crank assembly (e.g., the crank assembly 66), and the HMI 306 may be positioned at handlebars of the bicycle (e.g., the handlebars 54). In other embodiments, the HMI 306 is positioned elsewhere on or off of the bicycle.

The battery 302 includes a power supply 308, a processor 310, a wireless communication device 312 (e.g., a radio), and one or more sensors 314 in communication with each other. The battery 302 may include more, fewer, and/or different components. For example, the battery 302 may also include a user interface 316 (e.g., LEDs) and/or a memory.

The power supply 308 may be any number of different types of power supplies including, for example, a Lithium Ion power supply. The power supply 308 may include any number of battery cells. For example, the power supply 308 may include 26, 30, 32, or another number of battery cells.

The processor 310 may include a general processor, digital signal processor, an ASIC, FPGA, analog circuit, digital circuit, combinations thereof, or other now known or later developed processor. The processor 310 may be a single device or combinations of devices, such as through shared or parallel processing.

The radio 312 provides for wireless data and/or signal communication between the battery 302 and one or more components (e.g., the drive unit 304 and the HMI 306) of the bicycle and/or an external device such as a mobile phone or other computing device. The radio 312 is part of a wireless communication system 318 and includes one or more antennae. The radio 312 provides for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Bluetooth® and or ANT+™ standards may also, or alternatively, be used. Accordingly, replacement standards and protocols having the same or similar functions as those disclosed herein are considered equivalents thereof. In an embodiment, the radio 312 may be configured to transmit a signal indicative of a fault. Further, the radio 312 may receive a system wake message.

The battery 302 may include any number of sensors 314. For example, the one or more sensors 314 may include an installation sensor 314*a* (e.g., a magnetic sensor; the sensor 198) and a movement sensor 314*b* (e.g., a vibration sensor; the IMU 186). The battery 302 may include more, fewer, and/or different sensors 314.

The drive unit 304 includes an electrical communication device 320 (e.g., a power communication device), a wireless communication device 322 (e.g., a radio), a processor 324, a motor 326, and one or more sensors 328 in communication with each other. The drive unit 304 may include more, fewer, and/or different components. For example, the drive unit 304 may also include a user interface 329 (e.g., LEDs) and/or a memory.

The electrical communication device 320 may be an interface that electrically connects the drive unit 304 to at least the battery 302 for the transmission of power. The battery 302 may include power outputs (e.g., two power outputs; positive and ground), and the interface 320 may include contacts that abut (e.g., physically contact) the power outputs of the battery 302 when the battery 302 is installed on the bicycle. In other embodiments, the electrical communication device 320 may include more and/or different components. For example, the electrical communication device 320 may include wires (e.g., for positive and ground, respectively), a plug, one or more connectors, and/or other components.

The radio 322 provides for wireless data and/or signal communication between the drive unit 304 and one or more components (e.g., the battery 302 and the HMI 306) of the bicycle and/or an external device such as a mobile phone or other computing device. The radio 322 is part of the wireless communication system 318 and includes one or more antennae. The radio 322 provides for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Bluetooth® and or ANT+™ standards may also, or alternatively, be used. Accordingly, replacement standards and protocols having the same or similar functions as those disclosed herein are considered equivalents thereof. In an embodiment, the radio 322 may be configured to transmit acknowledgement messages. Further, the radio 322 may receive a system wake message.

The processor 324 may include a general processor, digital signal processor, an ASIC, FPGA, analog circuit, digital circuit, combinations thereof, or other now known or later developed processor. The processor 324 may be a single device or combinations of devices, such as through shared or parallel processing.

The motor 326 drives a wheel of the bicycle through a transmission. The motor 326 may include a gear reduction to allow the motor 326 to provide additional torque to the transmission or the wheel of the bicycle. The motor 326 may be any number of different types of motors including, for example, a brushless direct current (DC) mid-drive motor. The motor 326 may be, for example, a 250 Watt motor, a 350 Watt motor, or a 500 Watt motor. Other types of motors may be used for the motor 326.

The drive unit 304 may include any number of sensors 328. For example, the one or more sensors 328 may include a torque sensor 328a and one or more drive unit sensors 328b (e.g., a temperature sensor). The drive unit 304 may include more, fewer, and/or different sensors 328.

The HMI 306 includes an electrical communication device 330 (e.g., a power communication device), a wireless communication device 332 (e.g., a radio), a processor 334, and a user interface 336 in communication with each other. The HMI 306 may include more, fewer, and/or different components. For example, the HMI 306 may also include a memory. The HMI 306 includes a housing 337 that supports, for example, the electrical communication device 330, the wireless communication device 332, the processor 334, and the user interface 336. In one embodiment, at least the wireless communication device 332 and the processor 334 are supported within the housing 337 of the HMI 306.

The electrical communication device 330 may include an interface that electrically connects the HMI 306 to at least the battery 302 for the transmission of power. The interface 330 may include contacts that are electrically connected to (e.g., with wires and/or one or more connectors) the power outputs of the battery 302 when the battery 302 is installed on the bicycle. The electrical communication device 330 may include more and/or different components. For example, the electrical communication device 330 may include wires (e.g., for positive and ground, respectively), a plug, one or more connectors, and/or other components.

The radio 332 provides for wireless data and/or signal communication between the HMI 306 and one or more components (e.g., the battery 302 and the drive unit 304) of the bicycle and/or an external device such as a mobile phone or other computing device. For example, the radio 332 may be configured to wirelessly transmit system wake messages and system sleep messages to the battery 302 and the drive unit 304 via the wireless communication system 318. Further, the radio 332 may receive a charging state message.

The radio 332 is part of the wireless communication system 318 and includes one or more antennae. The radio 332 provides for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Bluetooth® and or ANT+™ standards may also, or alternatively, be used. Accordingly, replacement standards and protocols having the same or similar functions as those disclosed herein are considered equivalents thereof.

The processor 334 may include a general processor, digital signal processor, an ASIC, FPGA, analog circuit, digital circuit, combinations thereof, or other now known or later developed processor. The processor 334 may be a single device or combinations of devices, such as through shared or parallel processing.

The user interface 336 may include any number of components including, for example, one or more buttons, a keypad, a keyboard, a rocker switch, a touch pad, a voice recognition circuit, and/or another device or component for communicating data (e.g., about the battery 302) to a user. The user interface 336 may include a touch screen, which may be capacitive or resistive. The user interface 336 may include a liquid crystal display ("LCD") panel, light emitting diode ("LED"), LED screen, thin film transistor screen, or another type of display. The user interface 336 may also include audio capabilities, or speakers. In an embodiment, the user interface 336 includes an LED indicator. The LED indicator lights to indicate input of commands or other actions of the bicycle system 300.

The HMI 306 is configured to send and/or receive data such as control signals and/or commands to and/or from bicycle components such as the battery 302 and the drive unit 304. The HMI communicates 306 the data using any operable connection. An operable connection may be one in which signals, physical communications, and/or logical communications may be sent and/or received. An operable connection may include a physical interface, an electrical interface, and/or a data interface.

A wired power system 338 between the battery 302 (e.g., the power outputs of the battery 302), the drive unit 304 (e.g., the electrical communication device 320 of the drive unit 304), and the HMI 306 (e.g., the electrical communication device 330 of the HMI 306) is formed with physical positioning of the battery 302, the drive unit 304, and/or the HMI 306 relative to each other, and/or components such as electrical contacts, wires, plugs, connections, and/or other components. In one embodiment, the wired power system 338 (e.g., via the power outputs of the battery 302) provides the only wired connections between the battery 302, the drive unit 304, and the HMI 306. In other words, the bicycle system 300 does not include a separate power button (e.g., at the HMI 306) with a wired connection to the battery 302, and thus does not include a power button signal/communications bus.

Figure 9:
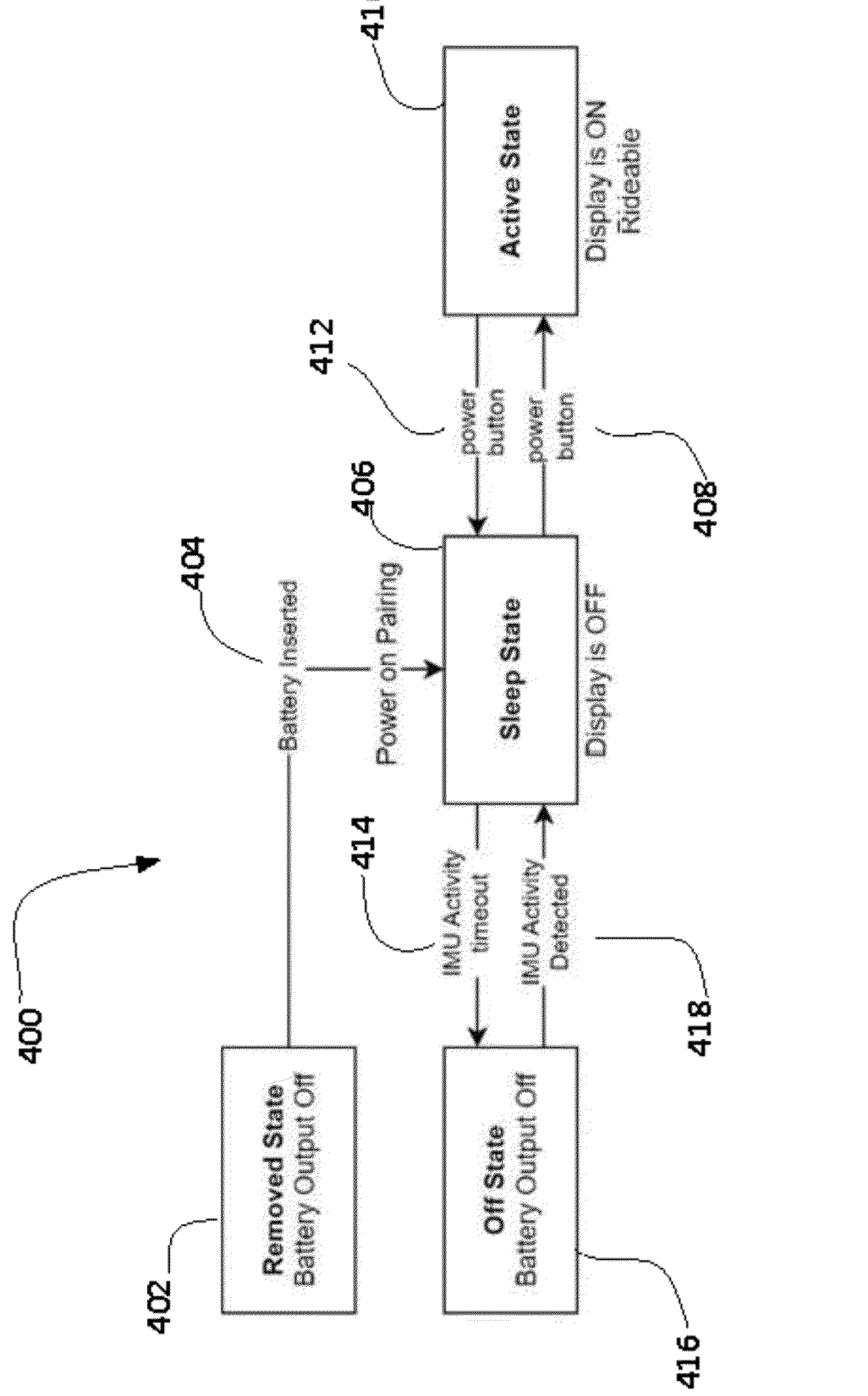
FIG. 9 is a flowchart of one embodiment of a method of battery power output sequencing.

FIG. 9 is a flowchart of an embodiment of a method 400 for control of a battery (e.g., the battery 302) and an HMI (e.g., the HMI 306) of an electric bicycle (e.g., the bicycle 50). The flowchart also illustrates a method for transmitting and receiving wireless signals on the electric bicycle. For example, the battery may change a mode of the battery based on a wireless signal received from another component of the electric bicycle (e.g., the HMI).

As presented in the following sections, the acts may be performed using any combination of the components indicated in previous figures. For example, the following acts may be performed by at least some components of the bicycle system 300, as well as additional or other components. In an embodiment, the acts may be performed by, for example, the battery 302 and the HMI 306. Additional, different, or fewer acts may be provided. The acts are performed in the order shown or in other orders. The acts may be repeated.

In act 402, the battery is removed from the bicycle (e.g., a frame of the bicycle). In other words, the battery is in a removed state. The battery includes a processor (e.g., the processor 310 of the battery 302 of FIG. 8) configured to determine whether the battery is installed on the bicycle (e.g., on the frame of the bicycle) based on data from a first sensor of the battery (e.g., the installation sensor 314a of the battery 302 of FIG. 8). For example, the first sensor includes a magnetic sensor configured to detect a magnet mounted on and/or in the frame of the bicycle. The magnetic sensor generates the data based on a sensed magnetic field strength and transmits the generated data to processor. The processor may determine the battery is installed on the bicycle when, based on the received data, the sensed magnetic field strength is greater than a predetermined threshold magnetic field strength. The processor may determine the battery is not installed on the bicycle when, based on the received data, the sensed magnetic field strength is less than (or equal to) the predetermined threshold magnetic field strength.

When the processor determines the battery is not installed on the bicycle, power from battery cells of the battery (e.g., the power supply 308 of the battery 302 of FIG. 8) to power outputs (e.g., output terminals) of the battery is deactivated. In other words, output of the battery is off. For example, the battery includes one or more switches, and the processor opens the one or more switches, such that current is not able to flow from the battery cells to the power outputs of the battery.

In act 404, the battery is attached to (e.g., inserted into) the bicycle (e.g., the frame of the bicycle), such that the battery may power one or more components of the bicycle (e.g., the HMI and the drive unit) via the power outputs of the battery and a wired power connection (e.g., the wired power system 338 of FIG. 8) between the battery and the one or more components of the bicycle. The attachment of the battery to the frame of the bicycle by a user, for example, may also physically and electrically connect the power outputs of the battery to the one or more components of the bicycle via the wired power connection.

In act 406, the processor of the battery determines, based on the data received from the first sensor, the battery is installed on the bicycle, and power from the battery cells of the battery to the power outputs of the battery is activated. For example, the processor of the battery closes the one or more switches, such that current is able to flow from the battery cells to the power outputs of the battery.

The HMI, which is electrically connected to the battery via the power outputs of the battery, may be in a sleep state (e.g., a powered but inactive (PBI) state). Other components (e.g., the drive unit) may also transition to a sleep state (e.g., a PBI state). In the sleep state, a display of the HMI is off. Power on pairing may be executed (e.g., by the processor of the battery) after the battery is inserted in act 404, such that a wireless communication network including the battery and at least one component of the bicycle (e.g., the HMI and the drive unit) is established.

In act 408, the one or more components of the bicycle (e.g., HMI and the drive unit) and, for example, the battery are activated. The one or more components of the bicycle may be activated in any number of ways. For example, the one or more components may be activated by user interaction with an interface (e.g., a power button; the user interface 336 of the HMI 306 of FIG. 8). The power button may be at a component of the one or more components of the bicycle (e.g., at the HMI) or may be a separate component with a separate battery (e.g., mounted on the handlebars).

The user interaction with the power button (e.g., pressing of the power button), for example, may cause the component (e.g., the HMI), for example, to generate system wake messages and transmit the system wake messages to at least one other component of the bicycle (e.g., the battery and the drive unit). The HMI, for example, may transmit the system wake messages to the battery and the drive unit, for example, via the established wireless network.

In act 410, the one or more components (e.g., the HMI and the drive unit) transition to an active state. The HMI and the drive unit, for example, may be powered and active after, for example, the power button is pressed by the user and the component transmits the system wake messages. In one embodiment, in the active state, a display of the HMI is on, and the bicycle is ridable (e.g., an assist motor of the drive unit is operable).

In act 412, the one or more components of the bicycle (e.g., HMI and the drive unit) and the battery are deactivated. The one or more components of the bicycle may be deactivated in any number of ways. For example, the one or more components may be deactivated by user interaction with the same interface (e.g., the power button) or user interaction with another interface (e.g., another power button).

The user interaction with the power button (e.g., pressing of the power button), for example, may cause the component (e.g., the HMI), for example, to generate system sleep messages (e.g., a sleep signal) and transmit the system sleep messages to at least one other component of the bicycle (e.g., the drive unit and the battery). The HMI, for example, may transmit the system sleep messages to the drive unit and the battery, for example, via the established wireless network. The HMI, for example, may transition back to the PBI state. In other words, the display of the HMI is turned off.

The battery may include a second sensor (e.g., the movement sensor 314b of the battery 302 of FIG. 8). The second sensor may include a vibration sensor (e.g., including an IMU and/or accelerometers) configured to identify movement of the battery, and thus movement of the bicycle when the battery is installed on the bicycle. In act 414, the processor of the battery identifies an activity timeout. For example, the vibration sensor generates vibration data (e.g., continuously or at predetermined intervals) and transmits the vibration data to the processor of the battery. The processor of the battery may compare a vibration magnitude or an acceleration of the vibration data to a predetermined threshold vibration and, based on the comparison, determine a time period (e.g., a continuous time period) over which the vibration magnitude or the acceleration of the vibration data, for example, is less than (or equal to) the predetermined threshold vibration. In other words, the processor of the battery may determine, based on the vibration data, how long the bicycle has been stationary (e.g., unused). The processor of the battery may compare the determined time period to a predetermined threshold time period, and when, based on the comparison, the determined time period is greater than the predetermined threshold time period, the processor of the battery may identify the activity timeout.

In act 416, based on the identified activity timeout, the processor of the battery deactivates power from the battery cells of the battery to the power outputs of the battery. For example, the processor opens the one or more switches of the battery, such that current is not able to flow from the battery cells to the power outputs of the battery. In act 416, the battery is in an off state (e.g., the power outputs of the battery are off).

In act 418, after the power from the battery cells of the battery to the power outputs of the battery has been deactivated due to the activity timeout identified in act 416, the processor transitions the HMI (e.g., and one or more other components such as the drive unit), for example, back to the PBI state when, based on the data generated by the second sensor, the processor of the battery identifies activity (e.g., vibration).

The method 400 of FIG. 9 may be executed by the battery transmitting messages to and receiving messages from components of the bicycle to be powered by the battery, and the battery transitioning between different states in response to at least some of these messages.

Figure 10:
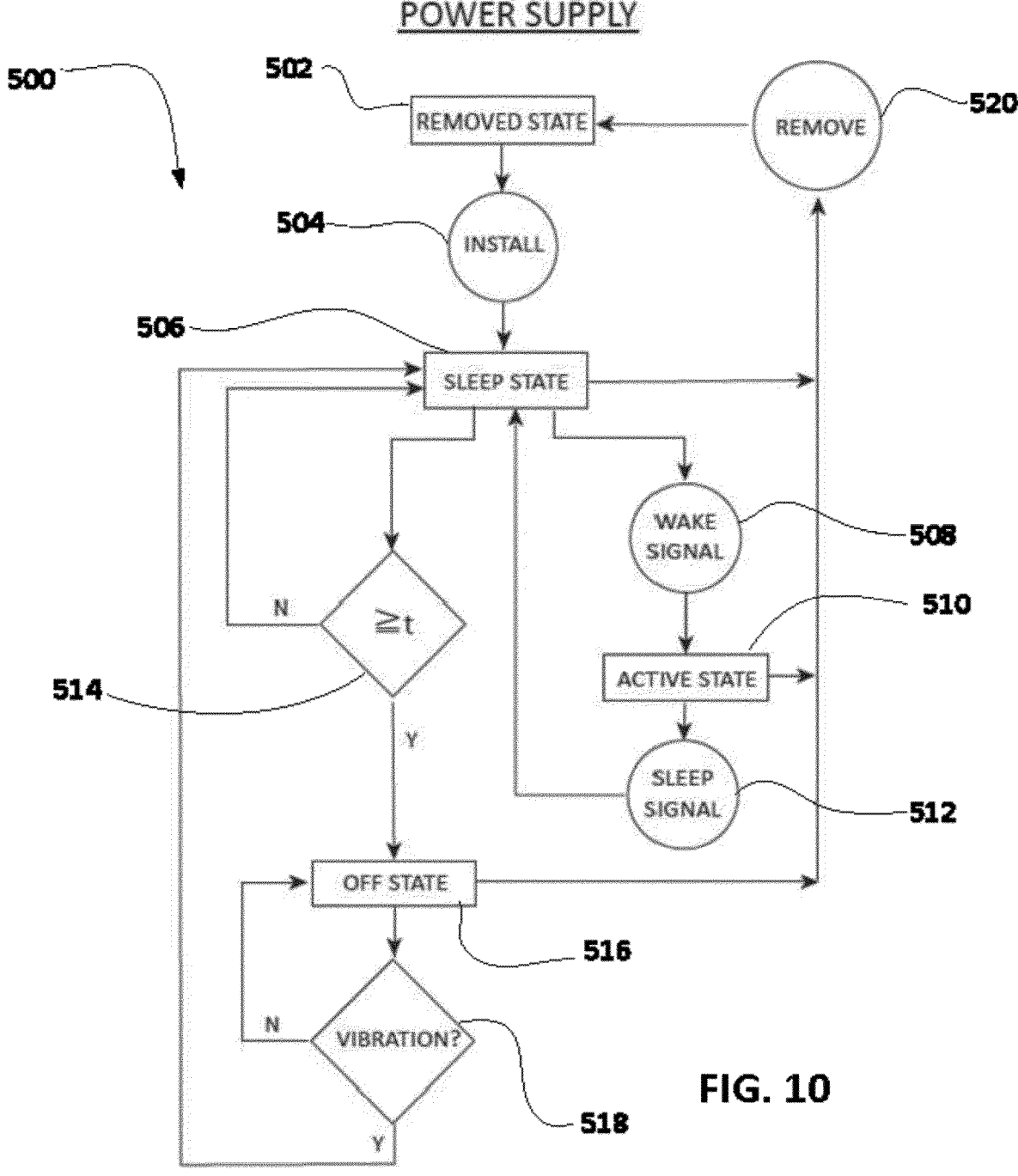
FIG. 10 is a flowchart of one embodiment of a method of operating a battery of a bicycle, such as the bicycle of FIG. 1.

FIG. 10 is a flowchart of an embodiment of a method 500 for such control of a battery (e.g., the battery 302) of an electric bicycle (e.g., the bicycle 50). The flowchart also illustrates a method for transmitting and receiving wireless signals on the bicycle. As presented in the following sections, the acts may be performed using any combination of the components indicated in previous figures. For example, the following acts may be performed by at least some components of the bicycle system 300, as well as additional or other components. In an embodiment, the acts may be performed by, for example, the battery 302, the drive unit 304, the HMI 306, or any combination thereof. Additional, different, or fewer acts may be provided. The acts are performed in the order shown or in other orders. The acts may be repeated.

In act 502, the battery is in a removed state. The battery includes a first sensor (e.g., a magnetic sensor; the installation sensor 314a of the battery 302 of FIG. 8) configured to detect a magnet mounted in and/or on a frame of the bicycle. A processor of the battery (e.g., the processor 310 of the battery 302 of FIG. 8) determines the battery is not installed in and/or on the frame of the bicycle based on data and/or a signal generated, or not generated, by the first sensor. For example, the first sensor may generate the data and/or the signal and transmit the data and/or the signal to the processor only when the first sensor detects the magnet in and/or on the frame of the bicycle (e.g., when the battery is installed on the frame of the bicycle); otherwise, the first sensor may not generate any data and/or signal.

In the removed state, the processor of the battery turns off power connections (e.g., power outputs) at a connector of the battery to prevent accidental short circuit. For example, the processor of the battery opens one or more switches between cells of the battery (e.g., the power supply 308 of the battery 302 of FIG. 8) and the power outputs, such that the power connections are turned off. In the removed state, the processor of the battery turns off a receiver of a radio of the battery (e.g., a receiver of the wireless communication device 312 of the battery 302 of FIG. 8), such that power is conserved. In one embodiment, the processor periodically transmits wireless battery status messages, via the radio, to a computing device on or off of the bicycle (e.g., a smart phone of a user). The battery status messages may include any number of different types of information including, for example, a state of charge of the battery, a temperature of the battery, and/or other information.

In act 504, the battery is installed in and/or on the bicycle. The battery is installed on the frame of the bicycle. For example, the frame may include one or more connectors (e.g., tabs, flanges, fasteners, and/or other connectors), and the battery may include one or more corresponding connectors (e.g., tabs, flanges, fasteners, and/or other connectors). The battery may be installed on the frame of the bicycle, such that the one or more connectors of the battery interact with the one or more connectors of the frame of the bicycle, respectively, and the battery is attached (e.g., mounted) to the frame of the bicycle. The attachment of the battery to the frame of the bicycle may facilitate the physical connection of the power outputs of the battery with interfaces (e.g., contacts) of one or more components of the bicycle (e.g., the HMI and/or the drive unit).

In act 506, the processor of the battery transitions the battery to a sleep state. In the sleep state, the processor of the battery activates power to the power outputs of the battery. In other words, the processor of the battery may close the one or more switches of the battery, such that current may flow between the cells of the battery and the power outputs of the battery.

In the sleep state, the processor of the battery may impose an electrical current limit. In other words, the sleep state of the battery may be a partially powered state of the battery. For example, the processor of the battery may monitor a current draw from the battery (e.g., via the power outputs) and compare the current draw to a predetermined current threshold. When, based on the comparison, the current draw is greater than the predetermined current threshold when the bicycle is in the sleep state (e.g., the bicycle appears off, no motor assistance possible), the processor may disable the power outputs (e.g., open the one or more switches) to prevent unintended operation of the bicycle.

In the sleep state, the processor may periodically turn on the receiver of the radio to receive an instruction to transition to a startup state or an active state (e.g., a wake signal). The periodical powering on of the receiver of the radio may be at any number of duty cycles. For example, the processor may turn on the receiver of the radio at a 10% duty cycle, a 20% duty cycle, or another duty cycle that provides an overlap in transmission timing with the startup signal. In one embodiment, the receiver of the radio is always on when the battery is in the sleep state.

In one embodiment, after installation of the battery in act 504, but before the processor of the battery transitions the battery to the sleep state in act 506, the processor of the battery may perform a wireless communication negotiation with one or more components of the bicycle (e.g., the HMI and/or the drive unit) to establish a wireless communication network between the battery and the one or more components of the bicycle.

In act 508, the processor of the battery receives, via the radio of the battery, the wake signal. A component of the bicycle may generate and transmit the wake signal (e.g., via the wireless communications network) in response to user input at the component. The wake signal may include instructions to transition from the sleep state to a startup state or an active state.

For example, the component of the bicycle may be the HMI, and the HMI may include a user interface (e.g., a power button; the user interface 336 of the HMI 306 of FIG. 8). The user may interact with the power button at the HMI, and the HMI may generate the wake signal and transmit the wake signal to the battery (e.g., and other components of the bicycle, such as the drive unit) via the wireless communications network.

In one embodiment, the power button is separate from, for example, the HMI (e.g., positioned on the handlebars of the bicycle). The separate power button generates the wake signal based on user interaction with the separate power button, and transmits the wake signal to at least the battery (e.g., and the HMI) via the wireless communications network.

In act 510, the processor transitions the battery to an active state based on the wake signal received in act 508. In the active state, the processor of the battery may increase the electrical current limit to allow for motor activation (e.g., activation of the motor 326 of the drive unit 304 of FIG. 8). For example, the active state of the battery may be a full power state of the battery. The processor of the battery may also control the receiver of the radio to be continuously on to receive messages while the battery is in the active state.

In the active state, the processor of the battery may periodically send status information about the battery to one or more components of the bicycle (e.g., the HMI and the drive unit) and/or one or more devices off the bicycle (e.g., a smart phone and/or a computer) via the radio of the battery and the wireless communications network (e.g., the wireless communication system 318 of FIG. 8). The status information may include any number of different types of information including, for example, a state of charge of the battery, one or more temperatures of the battery, and/or other information about the battery. The processor of the battery may send more and/or different information about the battery via the radio of the battery and the wireless communications network. For example, the processor may transmit information about maximum recommended current to be drawn by an electric motor to prevent triggering an undervoltage condition in the battery to, for example, the drive unit.

In one embodiment, in response to the wake signal received in act 508 and prior to transitioning the battery to the active state, the processor of the battery may start up the battery (e.g., within a startup state) to prepare the battery for entering the active state. The startup may include the processor of the battery generating an acknowledgement message and transmitting the acknowledgement message, via the radio of the battery, to at least a component of the bicycle that sent the wake message (e.g., the HMI). The processor of the battery may perform any number of actions prior to transitioning to the active state in act 510. For example, in the startup, the processor of the battery may perform sensor initialization, a self-test, loading of non-volatile storage, and/or one or more other actions.

In act 512, the processor of the battery receives, via the radio of the battery, a sleep signal. The processor of the battery receives, via the radio of the battery and the wireless communications network, the sleep signal from, for example, the HMI. For example, the sleep signal is generated by the HMI in response to user interaction at the user interface of the HMI, and the HMI transmits the sleep signal to the battery via the wireless communications network and the radio of the battery.

After act 512, the method 500 returns to act 506, and the processor of the battery transitions the battery to the sleep state. In one embodiment, the processor of the battery, after receiving the sleep signal, prepares for the sleep state and performs any number of acts (e.g., within a prepare for sleep state) prior to transitioning the battery to the sleep state. For example, prior to transitioning the battery to the sleep state, the processor of the battery may generate and transmit, via the radio of the battery and the wireless communications network, an acknowledgement message. The acknowledgement message may acknowledge receipt of the sleep signal and may be transmitted to at least the component that sent the sleep signal (e.g., the HMI).

While in the sleep state, the processor of the battery determines, in act 514, whether the battery, and thus the bicycle, has been stationary for a predetermined period of time t. The battery includes a second sensor (e.g., the movement sensor 314b of the battery 302 of FIG. 8) in communication with the processor of the battery. The second sensor may be configured to identify vibration of the battery when the battery moves (e.g., via movement of the bicycle while the battery is installed on the bicycle). The second sensor may include any number of different types of sensors including, for example, an IMU, one or more accelerometers, a vibration sensor, and/or one or more other types of sensors.

The second sensor of the battery may monitor vibration of the battery and may generate a signal and transmit the signal to the processor of the battery when the second sensor identifies vibration of the battery. In the sleep state, the processor of the battery may track a continuous time period (e.g., run an activity timer) during which no signal identifying vibration of the battery is received from the second sensor of the battery.

The processor may compare the tracked continuous time period to the predetermined period of time t (e.g., thirty minutes, one hour, one day), and when, based on the comparison, the tracked continuous time period is greater than the predetermined period of time t (e.g., the processor determines the battery has been stationary for the predetermined period of time t), the method 500 moves to act 516. When, based on the comparison, the tracked continuous time period is less than the predetermined period of time t (e.g., the processor determines the battery has been stationary for less than the predetermined period of time t), the method 500 returns to act 506, and the battery remains in the sleep state.

In one embodiment, the processor of the battery may also determine whether the battery (e.g., the processor of the battery) has received, via the radio of the battery, a wireless signal (e.g., app activity) during the predetermined period of time t (e.g., as in act 508). If the battery receives a wireless signal, the tracked continuous time period may be reset.

In one embodiment, the processor of the battery may run an additional activity timer when the battery is in the active state. For example, when the processor of the battery determines there is no vibration (e.g., no signal is received from the second sensor), no wireless activity (e.g., no messages or signals received via the radio), and no discharge current for the predetermined period of time t or another predetermined period of time (e.g., 15 minutes, 45 minutes, two hours, six hours), the processor of the battery may transition the battery back to the sleep state, and the method 500 may return to act 506.

In act 516, the processor transitions the battery to the off state (e.g., installed but off state). In the off state, the processor of the battery may electrically disable the power outputs of the battery (e.g., power connections to a remainder of the bicycle), and may turn off the receiver of the radio completely, such that power may be saved.

While in the off state, the processor of the battery determines, in act 518, whether the battery, and thus the bicycle, has moved. The processor of the battery determines whether the battery has moved based on whether a signal has been received from the second sensor (e.g., generated in response to vibration of the battery of the bicycle). If, based on the determination in act 518, the battery has moved, the method 500 returns to act 506, and the processor of the battery transitions the battery to the sleep state. If, based on the determination in act 518, the battery remains stationary, the method 500 returns to act 516, and the battery remains in the off state.

While in the sleep state in act 506, the active state in act 510, or the off state in act 516, if the battery is removed from the bicycle, as in act 520, the method 500 returns to act 502, and the processor of the battery transitions the battery to the removed state.

In one embodiment, while the battery is in any state (e.g., the off state, the sleep state, or the active state), the processor of the battery may identify a fault condition of the battery and force the battery to immediately enter a fault state. A fault is a critical failure of any device. The processor of the battery may monitor for any number of different fault conditions including, for example, an undervoltage condition, a short circuit, an under-temperature condition, an over-temperature condition, and/or another fault condition. In the fault state of the battery, the processor of the battery may disconnect the power outputs of the battery (e.g., via the one or more switches of the battery) or reduce a maximum current draw from the battery based on a severity of the fault condition. For example, when the processor identifies a fault condition that is less severe (e.g., 1° C. above a predetermined maximum temperature threshold), the processor may reduce the maximum current draw from the battery, such that power is still supplied to electrically connected components of the bicycle (e.g., so that the HMI may still display messages to the user if safe to do so).

In one embodiment, while the battery is in any state (e.g., the off state, the sleep state, or the active state), when the processor of the battery detects charging (e.g., charging while the battery is installed on the bicycle), the processor of the battery may transition the battery to a charging state. In the charging state of the battery, the processor of the battery may transmit, via the radio of the battery and the wireless communications network, information about a charging session to one or more components of the bicycle (e.g., the HMI). The information about the charging session may include any number of different types of information including, for example, a state of charge, a charging rate, one or more temperatures of the battery, an estimated remaining time to charge, and/or other types of information.

Figure 11:
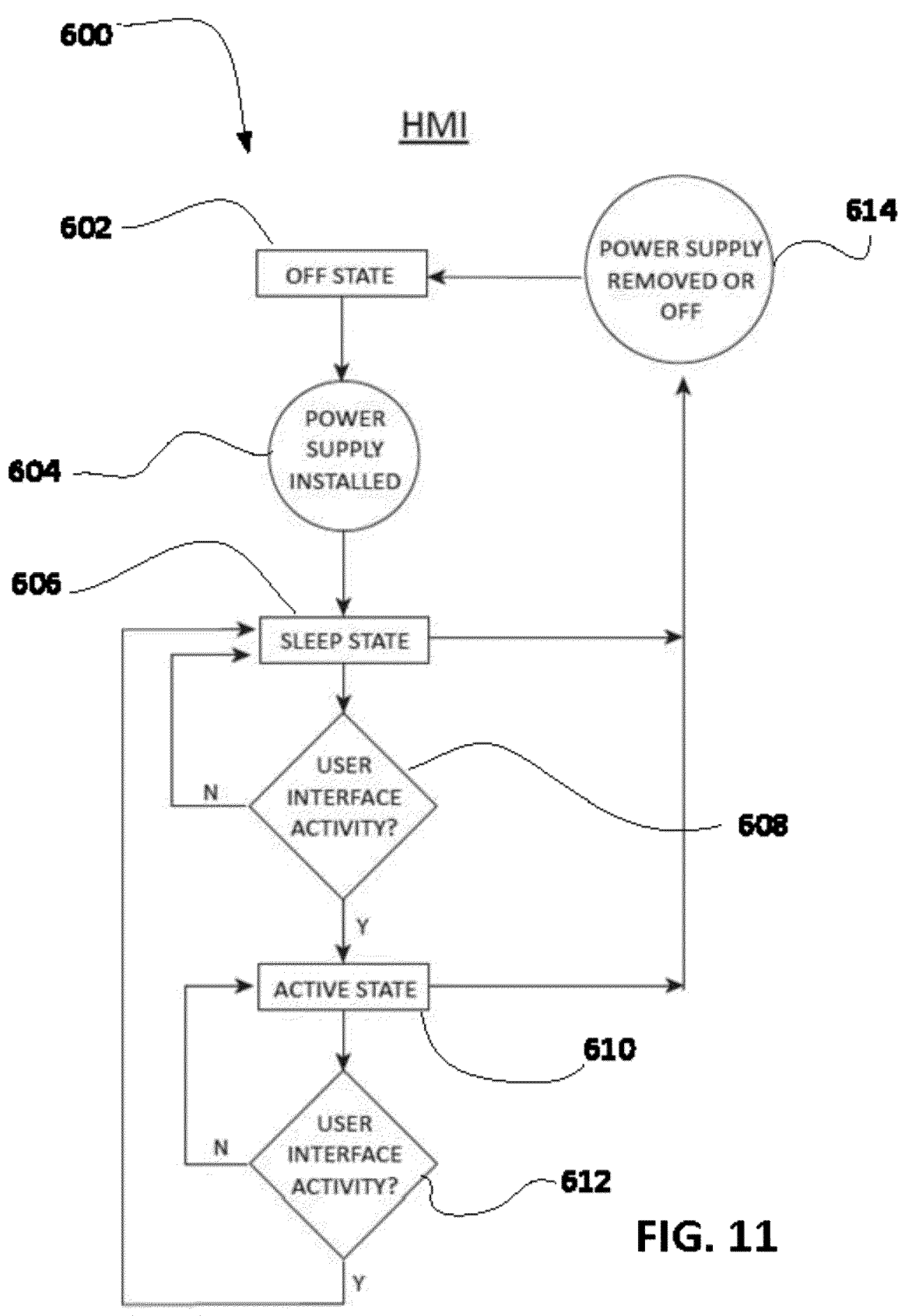
FIG. 11 is a flowchart of one embodiment of a method of operating a human-machine-interface (HMI) of a bicycle, such as the bicycle of FIG. 1.

FIG. 11 is a flowchart of an embodiment of a method 600 for control of an HMI (e.g., the HMI 306) of an electric bicycle (e.g., the bicycle 50). The flowchart also illustrates a method for transmitting and receiving wireless signals on the bicycle. As presented in the following sections, the acts may be performed using any combination of the components indicated in previous figures. For example, the following acts may be performed by at least some components of the bicycle system 300, as well as additional or other components. In an embodiment, the acts may be performed by, for example, the battery 302, the drive unit 304, the HMI 306, or any combination thereof. Additional, different, or fewer acts may be provided. The acts are performed in the order shown or in other orders. The acts may be repeated.

In act 602, the HMI is in an off state. In the off state, the HMI receives no power and is inoperable.

In act 604, a battery that is electrically connectable to the HMI is installed in and/or on the bicycle. For example, the battery is installed on a frame of the bicycle. The frame may include one or more connectors (e.g., tabs, flanges, fasteners, and/or other connectors), and the battery may include one or more corresponding connectors (e.g., tabs, flanges, fasteners, and/or other connectors). The battery may be installed on the frame of the bicycle, such that the one or more connectors of the battery interact with the one or more connectors of the frame of the bicycle, respectively, and the battery is attached (e.g., mounted) to the frame of the bicycle.

The attachment of the battery to the frame of the bicycle may facilitate the physical connection of power outputs of the battery with interfaces (e.g., contacts) of one or more components of the bicycle (e.g., the HMI). When the battery is installed on the frame of the bicycle in act 604, for example, the HMI may be physically connected to the battery and may be electrically connected to power outputs of the battery (e.g., via one or more contacts, wires, and/or connectors). The power outputs of the battery may be activated when the battery is installed on the frame of the bicycle, for example, such that the HMI is powered by the battery via the power outputs of the battery.

In act 606, a processor of the HMI transitions the HMI to a sleep state. In the sleep state of the HMI, at least one user interface of the HMI may be off. For example, a display and lights (e.g., LEDs) of the HMI may be off when the HMI is in the sleep state. In one embodiment, in the sleep state of the HMI, the processor of the HMI is in a low power mode, and a receiver of a radio of the HMI is in a low rate of receive mode (e.g., a duty cycle of 10%) in order to save power.

In act 608, the processor of the HMI determines whether a first user input has been received at the HMI. The HMI includes, for example, a first user interface, and the processor of the HMI determines whether the first user interface has been interacted with by a user. For example, the first user interface is a power button (e.g., a first power button) that generates a signal in response to the first user input, and transmits the signal to the processor of the HMI.

If the first user input has not been received, the method 600 returns to act 606, and the HMI remains in the sleep state.

When the processor determines, in act 608, the first user input has been received, the method 600 moves to act 610. In one embodiment, before the method 600 moves to act 610, the processor of the HMI may start up the HMI (e.g., within a startup state of the HMI) to prepare the HMI for entering the active state. The startup may include the processor of the HMI generating system wake messages (e.g., a wake signal) and transmitting the system wake messages, via the radio of the HMI and a wireless communications network, to one or more components of the bicycle (e.g., the battery and a drive unit). The method 600 may not move to act 610 until the HMI receives, via the radio of the HMI, acknowledgement messages from the one or more components. The acknowledgement messages may acknowledge receipt of the wakeup signal.

In act 610, the processor of the HMI transitions the HMI to an active state. In the active state of the HMI, the processor of the HMI activates the at least one user interface previously off in act 606 (e.g., the display and the LEDs). The at least one activated user interface provides at least one user interface for the user to configure and operate the bicycle, and, for example, view information about the bicycle (e.g., a state of charge of the bicycle or a ride mode).

In act 612, the processor of the HMI determines whether a second user input has been received at the HMI. The processor of the HMI determines whether the first user interface (e.g., the first power button) or a second user interface (e.g., a second power button) of the HMI has been interacted with by a user. In one embodiment, the user interacts with a same user interface (e.g., a same power button; the first power button) in act 608 and act 612. In another embodiment, the user interacts with different user interfaces (e.g., the first power button and the second power button, different power buttons) in act 608 and act 612, respectively.

When the processor determines, in act 612, the second user input has been received, the method 600 returns to act 606, and the processor of the HMI transitions the HMI back to the sleep state. If, in act 612, the second user input has not been received, the method 600 returns to act 610, and the HMI remains in the active state.

In one embodiment, when the processor determines, in act 612, the second user input has been received, but before the processor of the HMI transitions the HMI back to the sleep state, the processor of the HMI prepares for the sleep state and performs any number of acts (e.g., within a prepare for sleep state of the HMI) prior to transitioning the HMI to the sleep state. For example, prior to transitioning the HMI to the sleep state, the processor of the HMI generates system sleep messages (e.g., a sleep signal) and transmits the system sleep messages, via the radio of the HMI and the wireless communications network, to one or more components of the bicycle (e.g., the battery and the drive unit). The method 600 may not return to act 606 until the processor of the HMI receives, via the radio of the HMI, acknowledgement messages from the one or more components (e.g., the battery and the drive unit). The acknowledgement messages may acknowledge receipt of the system sleep messages, respectively.

The processor of the HMI may execute other actions while preparing for the sleep state of the HMI. For example, the processor of the HMI may perform sensor initialization, self-testing, loading of non-volatile storage, and/or one or more other actions.

While in the sleep state in act 606 or the active state in act 610, if the battery is removed from the bicycle, as in act 614, the method 600 returns to act 602, and the processor of the HMI transitions the HMI to the off state. The method 600 may also return to act 602, with the processor of the HMI transitioning the HMI to the off state, when the battery transitions to the off state (e.g., is turned off) while the battery is still installed on the bicycle.

In one embodiment, while the HMI is in the active state, the processor of the HMI may receive, via the radio of the HMI, a fault message (e.g., from the battery). When the processor of the HMI receives the fault message, the processor of the HMI may transition the HMI into a display fault state, in which the processor of the HMI communicates (e.g., via the display or the LEDs) fault information included within the fault message, for example, to the user.

In one embodiment, while the HMI is in the sleep state or the active state, when the processor of the HMI receives, via the radio of the HMI, a charging state message, the processor of the HMI may transition the HMI into a show charging state, in which the processor of the HMI communicates (e.g., via the display or the LEDs) information about the battery (e.g., a state of charge). This may apply to when the battery is installed on the bicycle and being charged.

Figure 12:
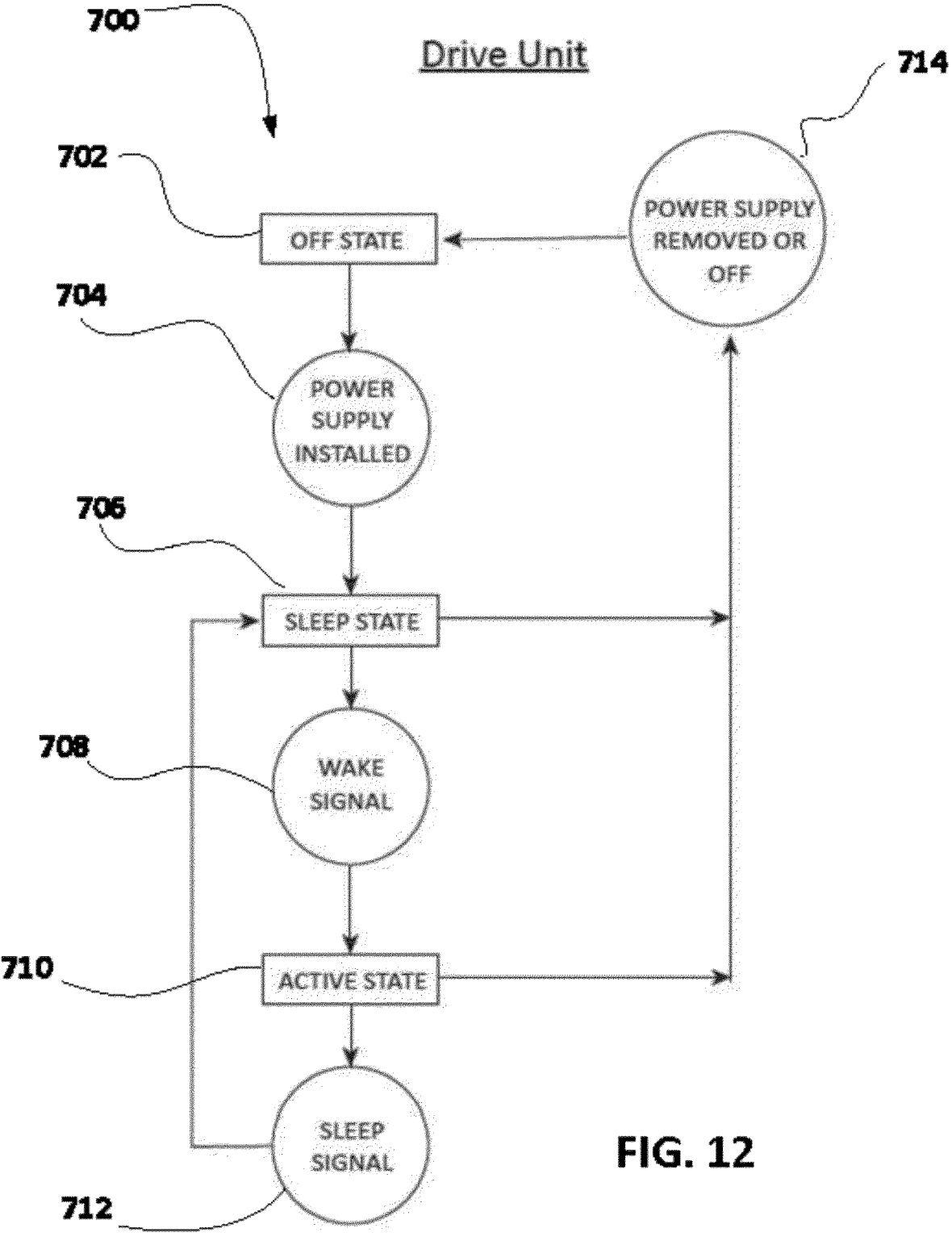
FIG. 12 is a flowchart of one embodiment of a method of operating a drive unit of a bicycle, such as the bicycle of FIG. 1.

FIG. 12 is a flowchart of an embodiment of a method 700 for control of a drive unit (e.g., the drive unit 304) of an electric bicycle (e.g., the bicycle 50). The flowchart also illustrates a method for transmitting and receiving wireless signals on the bicycle. As presented in the following sections, the acts may be performed using any combination of the components indicated in previous figures. For example, the following acts may be performed by at least some components of the bicycle system 300, as well as additional or other components. In an embodiment, the acts may be performed by, for example, the battery 302, the drive unit 304, the HMI 306, or any combination thereof. Additional, different, or fewer acts may be provided. The acts are performed in the order shown or in other orders. The acts may be repeated.

In act 702, the drive unit is in an off state. In the off state, the drive unit receives no power and is inoperable.

In act 704, a power supply (e.g., the battery 302 of FIG. 8) is installed on the bicycle. The power supply may be a battery that is electrically connectable to the drive unit. The battery may, for example, be installed on a frame of the bicycle. The frame may include one or more connectors (e.g., tabs, flanges, fasteners, and/or other connectors), and the battery may include one or more corresponding connectors (e.g., tabs, flanges, fasteners, and/or other connectors). The battery may be installed on the frame of the bicycle, such that the one or more connectors of the battery interact with the one or more connectors of the frame of the bicycle, respectively, and the battery is attached (e.g., mounted) to the frame of the bicycle.

The attachment of the battery to the frame of the bicycle may facilitate the physical connection of power outputs of the battery with interfaces (e.g., contacts) of one or more components of the bicycle (e.g., the drive unit). When the battery is installed on the frame of the bicycle in act 704, for example, the drive unit may be physically connected to the battery and may be electrically connected to power outputs of the battery (e.g., via one or more contacts, wires, and/or connectors). The power outputs of the battery may be activated when the battery is installed on the frame of the bicycle, for example, such that the drive unit is powered by the battery via the power outputs of the battery.

In act 706, a processor of the drive unit (e.g., the processor 324 of the drive unit 304 of FIG. 8) transitions the drive unit into a sleep state. In the sleep state of the drive unit, a motor of the drive unit (e.g., the motor 326 of the drive unit 304 of FIG. 8) may still not be operable (e.g., the processor of the drive unit will not operate the motor). In one embodiment, in the sleep state of the drive unit, the processor of the drive unit may set sensors of the drive unit (e.g., the sensors 328 of the drive unit 304 of FIG. 8) to an off or low power state, and a receiver of a radio of the drive unit (e.g., a receiver of the wireless communication device 322 of the drive unit 304 of FIG. 8) may be set to a low rate of receive mode (e.g., a duty cycle of 10%) in order to save power.

In act 708, the processor of the drive unit receives, via the radio of the drive unit, a wake signal. A component of the bicycle (e.g., the HMI 306 of FIG. 8) may generate and transmit the wake signal (e.g., via a wireless communications network) in response to user input at the component (e.g., at the user interface 336 of the HMI 306 of FIG. 8). The wake signal may include instructions to transition from the sleep state to a startup state or an active state.

For example, the component of the bicycle may be the HMI, and the HMI may include a power button (e.g., the user interface 336). The user may interact with the power button at the HMI, and the HMI may generate the wake signal and transmit the wake signal to the drive unit (e.g., and other components of the bicycle, such as the battery) via the wireless communications network (e.g., the wireless communication system 318 of FIG. 8).

In one embodiment, the power button is separate from, for example, the HMI (e.g., positioned on the handlebars of the bicycle). The separate power button generates the wake signal based on user interaction with the separate power button, and transmits the wake signal to at least the drive unit (e.g., and the battery and the HMI) via the wireless communications network.

The processor of the drive unit may periodically turn on the receiver of the radio (e.g., with a same timing of a powering on of the battery) to receive the wake signal (e.g., an instruction to transition to a startup state). In one embodiment, the processor of the drive unit may start up the drive unit after the wake signal is received. In the startup, the processor of the drive unit may generate and transmit, via the radio of the drive unit and the wireless communications network, an acknowledgement message to at least the component from which the wake signal is received. The acknowledgement message may acknowledge receipt of the wake signal.

The processor of the drive unit may execute any number of other actions when the drive unit is in the startup. For example, in the startup of the drive unit, the processor of the drive unit may execute sensor initialization, self-test, loading of non-volatile storage, and/or one or more other actions.

In act 710, the processor of the drive unit transitions the drive unit into an active state. In the active state, the motor of the drive unit is operable (e.g., the processor of the drive unit will operate the motor). In one embodiment, in the active state of the drive unit, the processor of the drive unit may set sensors of the drive unit to a full power state, and the receiver of the radio of the drive unit may be set to a continuously on mode (e.g., a duty cycle of 100%).

In act 712, the processor of the drive unit receives, via the radio of the drive unit, a sleep signal. The sleep signal includes, for example, instructions to transition the drive unit from the active state to the sleep state. The processor of the drive unit may, for example, receive the sleep signal from, for example, the HMI, via the radio of the drive unit and the wireless communications network.

The method 700 returns to act 706, and the processor of the drive unit transitions the drive unit into the sleep state. In one embodiment, the processor of the drive unit prepares for the sleep state and performs any number of acts (e.g., within a prepare for sleep state) before transitioning the drive unit into the sleep state. For example, prior to transitioning the drive unit to the sleep state, the processor of the drive unit may generate and transmit, via the radio of the drive unit and the wireless communications network, an acknowledgement message. The acknowledgement message may acknowledge receipt of the sleep signal and may be transmitted to at least the component that sent the sleep signal (e.g., the HMI).

While in the sleep state in act 706 or the active state in act 710, if the battery is removed from the bicycle, as in act 714, the method 700 returns to act 702, and the processor of the drive unit transitions the drive unit to the off state. The method 700 may also return to act 702, with the processor of the drive unit transitioning the drive unit to the off state, when the battery transitions to the off state (e.g., is turned off) while the battery is still installed on the bicycle (e.g., due to inactivity).

In one embodiment, while the drive unit is in the active state, the processor of the drive unit may receive, via the radio of the drive unit, a fault message (e.g., from the battery). When the processor of the drive unit receives the fault message, the processor of the drive unit may transition the drive unit into a safe state and configure sensors and the motor of the drive unit, for example, to safe configurations, respectively. The safe configuration of the motor of the drive unit, for example, may make the motor inoperable. The processor of the drive unit may also generate a status message that includes fault information, and transmit the status message via the radio of the drive unit and the wireless communications network.

In one embodiment, while the drive unit is in the sleep state or the active state, when the processor of the drive unit receives, via the radio of the drive unit, a charging state message, the processor of the drive unit may transition the drive unit into a system charge state, in which the processor of the drive unit disables motor activation. This may apply to when the battery is installed on the bicycle and being charged.

Dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, methods described herein may be implemented with software programs executable by a computer system, such as the circuitry. Further, in an exemplary, non-limited embodiment, implementations can include distributed processing, component/object distributed processing, and parallel processing. Alternatively, virtual computer system processing can be constructed to implement one or more of the methods or functionality as described herein.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware, as well as other electronic components. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, or a power meter system 40 to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

Although embodiments have been described for illustrative purposes, those skilled in the art will appreciate that various modifications, additions, and substitutions are possible, without departing from the scope and spirit of the disclosure. It is therefore intended that the foregoing description be regarded as illustrative rather than limiting, and that it be understood that all equivalents and/or combinations of embodiments and examples are intended to be included in this description.

Although certain parts, components, features, and methods of operation and use have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A system for an electric bicycle, the system comprising:
   an energy storage device comprising:
      a housing that is mountable to a frame of the electric bicycle;
      one or more battery cells disposed within the housing;
      output power terminals supported by the housing, the output power terminals being electrically connectable to the one or more battery cells;
      a processor; and a first wireless communication device; and a human/machine interface (HMI) electrically connected to the energy storage device via the output power terminals of the energy storage device, the HMI comprising a second wireless communication device, wherein the processor is configured to change a mode of the energy storage device based on a signal received by the first wireless communication device from the second wireless communication device.

2. The system of claim 1, wherein the first wireless communication device is located within the housing of the energy storage device.

3. The system of claim 2, wherein the first wireless communication device includes a first radio and a first antenna.

4. The system of claim 3, wherein the second wireless communication device includes a second radio and a second antenna.

5. The system of claim 1, wherein the processor is located within the housing of the energy storage device.

6. The system of claim 1, wherein the HMI includes an HMI housing, and the second wireless communication device is located within the HMI housing.

7. The system of claim 1, wherein the signal is a system wake message, wherein the HMI further comprises a user interface, and wherein the HMI is configured to:

generate the system wake message in response to a user interaction with the user interface of the HMI; and transmit the system wake message to the energy storage device via the second wireless communication device and the first wireless communication device.

8. The system of claim 7, wherein the processor of the energy storage device is configured to change the mode of the energy storage device from a sleep state to an active state based on the system wake signal received by the first wireless communication device from the second wireless communication device, and wherein the active state is a full power state of the energy storage device, and the sleep state is a partially powered state of the energy storage device.

9. The system of claim 8, wherein the system wake message is a first signal, wherein the processor of the energy storage device is further configured to change the mode of the energy storage device from the active state based on a second signal received by the first wireless communication device from the second wireless communication device.

10. The system of claim 9, wherein the user interaction is a first user interaction, and the second signal is a sleep message, wherein the HMI is further configured to:

generate the sleep message in response to a second user interaction with the user interface of the HMI; and transmit the sleep message to the energy storage device via the second wireless communication device and the first wireless communication device, and wherein the processor of the energy storage device is further configured to change the mode of the energy storage device from the active state to the sleep state based on the sleep message received by the first wireless communication device from the second wireless communication device.

11. The system of claim 8, wherein when the energy storage device is in the partially powered state, the processor is further configured to:

impose an electrical current limit for current flowing from the one or more battery cells to the output power terminals; and periodically turn on the first wireless communication device to receive instructions.

12. The system of claim 11, wherein when the energy storage device is in the full powered state, the processor of the energy storage device is further configured to:

increase the electrical current limit for the current flowing from the one or more battery cells to the output power terminals; and set the first wireless communication device to be continuously on.

13. The system of claim 1, wherein the HMI is electrically connected to the energy storage device via only the output power terminals of the energy storage device.

14. The system of claim 1, wherein the processor is a first processor, wherein the system further comprises a drive unit electrically connected to the energy storage device via the output power terminals of the energy storage device, wherein the drive unit comprises:

a second processor;

a third wireless communication device; and a motor, wherein the second processor is configured to change a mode of the drive unit from a first mode to a second mode based on a signal received by the third wireless communication device from the second wireless communication device, and wherein the motor of the drive unit is operable in one mode of the first mode and the second mode, and the motor of the drive unit is inoperable in the other mode of the first mode and the second mode.

15. The system of claim 14, wherein the drive unit is electrically connected to the energy storage device via only the output power terminals of the energy storage device.

16. A method of operating an electric bicycle, the method comprising:

receiving, by a first wireless communication device of the electric bicycle, a signal from a second wireless communication device of the electric bicycle, wherein the first wireless communication device is a wireless communication device of an energy storage device of the electric bicycle, and the second wireless communication device is a wireless communication device of a human/machine interface (HMI) electrically connected to the energy storage device via output power terminals of the energy storage device; and changing, by a processor of the energy storge device, a mode of the energy storage device in response to the received signal.

17. The method of claim 16, wherein the signal is a system wake message, wherein the method further comprises:

generating, by a processor of the HMI, the system wake message in response to a user interaction with a user interface of the HMI; and transmitting, by the second wireless communication device, the generated system wake message to the energy storage device via the first wireless communication device.

18. The method of claim 17, wherein changing the mode of the energy storage device in response to the received system wake message comprises changing the mode of the energy storage device from a sleep state of the energy storage device to an active state of the energy storage device in response to the received system wake message, and wherein the active state of the energy storage device is a full power state of the energy storage device, and the sleep state of the energy storage device is a partially powered state of the energy storage device.

19. The method of claim 18, further comprising imposing, by the processor of the energy storage device, an electrical current limit for current flowing from one or more battery cells of the energy storage device to the output power terminals of the energy storage device when the energy storage device is in the partially powered state.

20. An energy storage device for an electric bicycle, the energy storage device comprising:

a housing that is mountable to a frame of the electric bicycle;

one or more battery cells disposed within the housing;

output power terminals supported by the housing, the output power terminals being electrically connectable to the one or more battery cells, such that a human/machine interface (HMI) of the electric bicycle is powerable by the one or more battery cells via the output power terminals;

a processor; and a first wireless communication device, wherein the processor is configured to change a mode of the energy storage device from a first mode to a second mode based on a signal received by the first wireless communication device from a second wireless communication device, the second wireless communication device being a wireless communication device of the HMI, and wherein the first mode and the second mode of the energy storage device are different power states of the energy storage device, respectively.

\* \* \* \* \*